United States Patent
Leen et al.

(10) Patent No.: US 11,619,562 B2
(45) Date of Patent: Apr. 4, 2023

(54) SYSTEMS AND METHODS FOR EFFICIENTLY IDENTIFYING GAS LEAK LOCATIONS

(71) Applicant: ABB Schweiz AG, Baden (CH)

(72) Inventors: J. Brian Leen, Sunnyvale, CA (US); Douglas S. Baer, Menlo Park, CA (US); Susan Kasper, Monte Sereno, CA (US); Zachary Plante, Menlo Park, CA (US)

(73) Assignee: ABB Schweiz AG, Baden (CH)

( * ) Notice: Subject to any disclaimer, the term of this patent is extended or adjusted under 35 U.S.C. 154(b) by 126 days.

(21) Appl. No.: 17/064,330

(22) Filed: Oct. 6, 2020

(65) Prior Publication Data

US 2022/0107239 A1 Apr. 7, 2022

(51) Int. Cl.
*G01M 3/16* (2006.01)
*G01W 1/02* (2006.01)

(52) U.S. Cl.
CPC .............. *G01M 3/16* (2013.01); *G01W 1/02* (2013.01)

(58) Field of Classification Search
CPC ........ G01M 3/16; G01M 3/007; G01M 3/045; G01M 3/047; G01M 3/08; G01M 3/083; G01M 3/085; G01M 3/086; G01M 3/088; G01M 3/14; G01M 3/142; G01M 3/143; G01M 3/144; G01M 3/145; G01M 3/18; G01M 3/182; G01M 3/183; G01M 3/184; G01M 3/185; G01W 1/02; G01W 1/04; G01W 1/06; G01W 1/08; G08B 21/0484; G08B 21/0492; Y10S 200/16; Y10S 435/807; G01N 33/225; G01N 33/227; G01N 33/0057; G01N 2015/0007; G01N 2015/0038; G06V 20/17; H01Q 1/1207; H01Q 1/1264; G01S 3/065;
(Continued)

(56) References Cited

U.S. PATENT DOCUMENTS

| 5,297,421 A | 3/1994 | Hosonuma et al. |
| 6,518,562 B1 | 2/2003 | Cooper et al. |
| 6,724,481 B2 | 4/2004 | Makino et al. |

(Continued)

FOREIGN PATENT DOCUMENTS

| CN | 209370853 U | * 9/2019 | ............... F17D 5/02 |
| EP | 0 448 360 A1 | 9/1991 | |

(Continued)

OTHER PUBLICATIONS

Extended European Search Report issued in European Application No. 21201166.2, dated Mar. 9, 2022, 8 pages.

(Continued)

*Primary Examiner* — Daniel R Miller
*Assistant Examiner* — Eric Sebastian Von Wald
(74) *Attorney, Agent, or Firm* — Armstrong Teasdale LLP

(57) ABSTRACT

Systems and methods for efficiently identifying gas leak locations may include traversing, by an investigator and within a search area in which a gas leak has been indicated, a route defined according to at least one of a surge-cast algorithm or a surge-spiral algorithm. The systems and methods may also include sampling, with a gas detection device carried by the investigator, an environment along the route to identify a location of the gas leak.

23 Claims, 12 Drawing Sheets

(58) Field of Classification Search
CPC ............ G01C 21/3852; B64C 2201/00; B21D 19/084; G21C 17/07

See application file for complete search history.

(56) References Cited

U.S. PATENT DOCUMENTS

| | | | |
|---|---|---|---|
| 6,785,619 | B1 | 8/2004 | Homann et al. |
| 7,375,814 | B2 | 5/2008 | Reichardt et al. |
| 8,032,123 | B2 | 10/2011 | Sakhpara |
| 8,294,899 | B2 | 10/2012 | Wong |
| 8,781,755 | B2 | 7/2014 | Wong |
| 9,435,782 | B2 | 9/2016 | Lenz et al. |
| 9,482,591 | B2 | 11/2016 | Rella et al. |
| 9,494,511 | B2 | 11/2016 | Wilkins |
| 9,500,556 | B2 | 11/2016 | Rella et al. |
| 9,557,240 | B1 | 1/2017 | Tan et al. |
| 9,618,417 | B2 | 4/2017 | Rella et al. |
| 9,719,879 | B1 | 8/2017 | Tan et al. |
| 9,978,251 | B2 | 5/2018 | Gonia et al. |
| 10,161,825 | B2 | 12/2018 | Rella et al. |
| 2003/0043379 | A1* | 3/2003 | Makino ............ G01N 21/3504 250/339.08 |
| 2004/0050188 | A1 | 3/2004 | Richards et al. |
| 2008/0045156 | A1 | 2/2008 | Sakhpara |
| 2010/0091267 | A1 | 4/2010 | Wong |
| 2012/0028820 | A1 | 2/2012 | Rhodes et al. |
| 2013/0110400 | A1 | 5/2013 | Moshe |
| 2013/0220036 | A1 | 8/2013 | Faust |
| 2014/0318276 | A1 | 10/2014 | Cappa et al. |
| 2016/0146696 | A1 | 5/2016 | Steele et al. |
| 2018/0172544 | A1 | 6/2018 | MacMullin et al. |
| 2018/0292374 | A1* | 10/2018 | Dittberner .......... G01N 33/0047 |
| 2020/0232963 | A1* | 7/2020 | Zelinski ................ G01J 3/2823 |
| 2020/0371530 | A1* | 11/2020 | Anderson ............ B64C 39/024 |

FOREIGN PATENT DOCUMENTS

| | | | | |
|---|---|---|---|---|
| FR | 2831665 | A1 | 5/2003 | |
| RU | 2519405 | C1 | 6/2014 | |
| SU | 292097 | A1 | 1/1971 | |
| SU | 1366908 | A1 | 1/1988 | |
| WO | 2010/070147 | A1 | 6/2010 | |
| WO | WO-2012001686 | A1 * | 1/2012 | ............... G01N 1/26 |
| WO | 2015/052421 | A1 | 4/2012 | |
| WO | WO-2014038192 | A1 * | 3/2014 | ............... G01M 3/16 |
| WO | WO-2018075668 | A1 * | 4/2018 | ................ G01J 3/42 |

OTHER PUBLICATIONS

Ferri et al., "SPIRAL: A novel biologically-inspired alogrithm for gas/oder source locatization in an indoor environment wth no strong airflow", Robotics and Autonomous Systems, Elsevier BV, Amsterdam, NL, vol. 57, No. 4, (Apr. 30, 2009), pp. 393-402, XP025968849, ISSN: 0921-8890, doi: 10.1016/J.ROBOT.2008.07.004.

Neumann et al., "Gas source localization with a micro-drone using bio-inspired and particle filer-based alogrithms", Advanced Robotics, vol. 27, No. 9, (Jun. 1, 2013), pp. 725-738, XP055279290, ISSN: 0169-1864, doi: 10.1080/01691864.2013.779052.

Emery et al., "Adaptive Lévy Taxis for oder source localization in relaistic environmental conditions", 2017 IEEE International Conference on Robotics and Automation (ICRA), IEEE, (May 29, 2017), pp. 3552-3559, XP033127149, doi: 10.1109/ICRA.2017.7989407.

Jakuba, "Stochastic Mapping for Chemical Plume Source Localization with Application to Autonomous Hydrothermal Vent Discovery", downloaded from https://dspace.mit.edu/bitstream/handle/1721.1/38931/166142007-MIT.pdf?sequence=2, Apr. 19, 2007, 325 pages.

"Bio-Inspired and Probabilistic Algorithms for Distrubed Odor Source Localization using Mobile Robots", downloaded from https://infoscience.epfl.ch/record/143049/files/EPFL_TH4628.pdf, 2010, 6 pages.

Ishida et al.., "Remote sensing of gas/odor source location and concentration distribution using mobile system", Sensors and Actuators B 49 (1998) 52-57.

Reggente et al., "Using kocal Wind Information for Gas Distribution Mapping in Outdoor Environments with a Mobile Robot", IEEE Sensors 2009 Conference, pp. 1715-1720.

Fukazawa et al., "Estimating Gas-Source Location in Outdoor Environment Using Mobile Robot Equipped with Gas Sensors and Anemometer", IEEE Sensors 2009 Conference, pp. 1721-1724.

Neumann et al., "Autonomous Gas-Sensitive Microdrone", IEEE Robotics & Automation Magazine, Mar. 2012, pp. 50-61.

Lilienthal, "Chapter 10, Improved Gas Source Localization with a Mobile Robot by Learning Analytical Gas Dispersal Models from Statistical Gas Distribution Maps Using Evolutionary Algorithms", IGI Global, pp. 249-276.

McManus et al., "Field measurement of atmospheric methane with a HeNe laser-based real-time instrument", downloaded from https://www.spiedigitallibrary.org/conference-proceeings-of-spie on Mar. 20, 2019, 14 pages.

Hirst et al., "Oil and gas prospecting by ultra-sensitive optical gas detection with inverse gas dispersion modelling", Geophysical Research Letters, vol. 31, L12115, 2004, 4 pages.

"GIS for Petroleum", downloaded from www.ESRI.com/petroleum, Feb. 2007, 32 pages.

Thomson et al., "An improved algorithm for locating a gas source using inverse methods", Atmospheric Environment 41 (2007) 1128-1134.

Lamb et al., "Development of Atmospheric Tracer Methods to Measure Methane Emissions from Natural Gas Facilities and Urban Areas", Envir. Sci. Technol. 1995, 29, 1468-1479.

Leifer et al., In situ sensing of methane emissions from natural marine hydrocarbon seeps A potential remote sensing technology, Earth and Planetary Science Letter 245 (2006) 509-522.

Horst et al., "Footprint Estimation for Scalar Flux Measurements in the Atmospheric Surface Layer", Boundary-Layer Meteorology 59:279-296, 1992.

Lochmatter et al., "Tracking Odor Plumes in a Laminar Wind Field with Bio-Inspired Algorithms", Springer Tracts in Advanced Robotics, Nov. 2008, 16 pages.

Cabrita et al., "Odor guided exploration and plume tracking—Particle Plume Explorer", 6 pages.

Bennetts et al., "Mobile robots for localizing gas emission sources on landfill sites: is bio-inspiration the way to go?", fronteirs in Neuroengineering, Jan. 2012, vol. 4, Article 20, 12 pages.

Meng et al., "Collective Odor Source Estimation and Search in Time-Variant Airflow Environments Using Mobile Robots", Sensors 2001, 11, 29 pages.

Pavlin et al., "Gas Detection and Source Localization: A Bayesian Approach", 2011 IEEE, 8 pages.

Baetz et al., "Mobile Robots with Active IR-Optical Sensing for Remote Gas Detection and Source Localization", 2009 IEEE International Conference on Robotics and Automation, pp. 2773-2778.

Ishida et al., "Remote Sensing and Localization of Gas/Odor Source and Distribution Using Mobile Sensing System", Trasducers '97, 1997 International Conference on Solid-State Sensors and Actuators, pp. 559-563.

Ishida et al., "Three-Dimensional Gas-Plume Tracking Using Gas Sensors and Ultrasonic Anemometer", 2004 IEEE, pp. 1175-1178.

Ishida et al., "Mobile Robot Path Planning Using Vision and Olfaction to Search for a Gas Source", 2005 IEEE, pp. 1112-1115.

Jiang et al., "A Novel Object Recognition Method for Mobile Robot Localizing a Single Odor/Gas Source in Complex Environments", 2008 IEEE, 5 pages.

Wainner et al., "High Altitude Aerial Natural Gas Leak Detection System", Apr. 2007, 100 pages.

Thomas et al., "A GSO-Based Swarm Algoritm for Odor Source Localization in Turbulent Environments".

Awasthi et al., "Autonomous Mobile Robot for Gas Leakage Detection and Source Localization—A Review," Department of Mechanical and Automation Engineering, IGDTUW, Delhi-110006, India Journal of Material Science and Mechanical Engineering (JMSME) p-ISSN: 2393-9095; e-ISSN: 2393-9109; vol. 3, Issue 4; Apr.-Jun. 2016 pp. 262-267 © Krishi Sanskriti Publications.

(56) References Cited

OTHER PUBLICATIONS

Neumann et al., "Adaptive Gas Source Localization Strategies and Gas Distribution Mapping using a Gas-sensitive Micro-Drone," DOI 10.5162/sensoren2012/P5.4.
Burgués et al., "Smelling Nano Aerial Vehicle for Gas Source Localization and Mapping," Sensors; Accepted: Jan. 22, 2019; Published: Jan. 24, 2019.
Yang et al., "Natural Gas Fugitive Leak Detection Using an Unmanned Aerial Vehicle: Measurement System Description and Mass Balance Approach," Accepted: Sep. 28, 2018; Published: Oct. 1, 2018.
Li et al., "Moth-Inspired Chemical Plume Tracing on an Autonomous Underwater Vehicle," Accepted by IEEE Transactions on Robotics—Paper No. A04-268/A03-062 vol. 22, No. 2, pp. 292-307, Apr. 2006.
Ishida et al., "Plume-Tracking Robots: A New Application of Chemical Sensors," Reference: Biol. Bull. 200: 222-226. (Apr. 2001).
Russell et al., "A Robotic System to Locate Hazardous Chemical Leaks," IEEE International Conference on Robotics and Automation 0-7803-1965-6/95 01995 IEEE.
Husni et al., "Odor localization sub tasks: a survey," ISSN: 2180-1843; e-ISSN: 2289-8131 vol. 8 No. 3.
Neumann et al., "From Insects to Micro Air Vehicles—A Comparison of Reactive Plume Tracking Strategies" 2016.
Chen et al., "Odor source localization algorithms on mobile robots: a review and future look," Robotics and Autonomous Systems, vol. 112, Feb. 2019, p. 123-136.

\* cited by examiner

SYSTEMS AND METHODS FOR EFFICIENTLY IDENTIFYING GAS LEAK LOCATIONS

BACKGROUND

Advanced Leak Detection Systems (ALDS) leverage newly available, very high sensitivity natural gas (e.g., methane, ethane, mercaptans, or other constituents) detectors mounted on vehicles to rapidly survey for and detect natural gas leaks in a pipeline infrastructure. ALDS surveys typically produce an estimate of emission locations that are then followed up with a pinpointing survey using handheld detectors on foot. While the identification of the general area of a gas leak may occur rapidly, the on-foot investigation process following an ALDS survey is significantly more time consuming and costly. Investigators commonly spend 45 to 60 minutes per emission indication provided by a vehicle-based detection system. The time and cost is due, in large part, to low sensitivity handheld pinpointing tools and the concomitant lack of guidance on where and how to investigate emission indications. That is, ALDS provide walking investigators with a search area only, and success in finding the location of a gas leak is highly contingent on the skill and methods used by the investigator. Some investigators have a find rate as low as 10% while others may have a find rate as high as 90%. The find rate also varies greatly based on when an investigator was trained, as investigators typically experience a sharp increase in find rate after training, followed by a decline over time.

SUMMARY

According to one aspect of the present disclosure, a mobile compute device may comprise circuitry configured to obtain route data indicative of a route to be traveled along to identify a location of a gas leak and to present the route data to a user to guide the user along the route.

In some embodiments, to present the route data to the user may comprise to display a map of a geographic area with the route overlaid onto the map.

In some embodiments, to present the route data to the user may comprise to display directional arrows to the user indicative of directions in which to travel along the route.

In some embodiments, to present the route data may comprise to emit sounds or haptic signals indicative of instructions for traveling along the route.

In some embodiments, to obtain the route data may comprise to obtain route data produced based on search area data that is indicative of a geographic area in which a gas leak is detected.

In some embodiments, the circuitry may be configured to produce the route data.

In some embodiments, the circuitry may be configured to obtain the route data from a remote compute device.

In some embodiments, to obtain the route data may comprise to obtain route data produced based on a surge-cast algorithm, a surge-spiral algorithm, or a raster scan algorithm.

In some embodiments, to obtain the route data may comprise to obtain route data produced based on a gas plume model.

In some embodiments, to obtain the route data may comprise to obtain route data that has been adjusted as a function of an environmental condition.

In some embodiments, to obtain route data that has been adjusted as a function of an environmental condition may comprise to obtain route data in which the route has been rotated based on a wind direction.

In some embodiments, to obtain the route data may comprise to obtain route data adjusted as a function of one or more objects present in an environment.

In some embodiments, to obtain route data adjusted as a function of one or more objects present in the environment may comprise to obtain route data adjusted to include at least a portion of a perimeter of a building.

In some embodiments, to obtain route data adjusted as a function of one or more objects present in the environment may comprise to obtain route data in which the route has been adjusted to follow an edge of a street.

In some embodiments, to obtain route data adjusted as a function of one or more objects present in the environment may comprise to obtain route data in which the route has been adjusted to follow at least a portion of a gas line or other gas management infrastructure.

In some embodiments, to obtain route data may comprise to obtain route data in which the route has been adjusted according to a surge-cast algorithm In some embodiments, to obtain route data may comprise to obtain route data in which the route has been adjusted to pause traversal of the route in response to a determination that a detected wind velocity satisfies a predefined threshold.

In some embodiments, to obtain route data may comprise to obtain route data in which the route has been adjusted to pause traversal of the route in response to a determination that a detected wind velocity is less than a predefined velocity.

In some embodiments, the circuitry may be further configured to determine whether the wind velocity satisfies the predefined threshold for a predefined time period; change, in response to a determination that the wind velocity satisfied the predefined threshold for a predefined time period, the route from a route produced based on one algorithm to a route produced based on a second algorithm; and resume, after changing the route, traversal of the route.

In some embodiments, to change the route may comprise to change the route from a route produced based on a surge-cast algorithm or a surge-spiral algorithm to a route produced based on a raster scan algorithm.

In some embodiments, the circuitry may be further configured to determine one or more changes in a direction of the wind over a time period, determine whether the one or more changes in the direction of the wind are stochastic, and pause, in response to a determination that the one or more changes in the direction of the wind are stochastic, traversal of the route.

In some embodiments, the circuitry may be further configured to determine whether changes in the wind direction have remained stochastic for at least thirty seconds and change, in response to a determination that the changes in the wind direction have remained stochastic for at least thirty seconds, the route from a route based on a surge-cast algorithm or a surge-spiral algorithm to a route based on a raster scan algorithm.

In some embodiments, the circuitry may be further configured to resume traversal of the route after the route has been changed to a route based on a raster scan algorithm.

In some embodiments, the route may be within a search area, and the circuitry may be further configured to determine whether the location of the gas leak has been identified along the route, and augment, in response to a determination that the location of the gas leak has been identified, the route to cover a remainder of the search area based on a raster scan algorithm.

In some embodiments, to present the route data may comprise to present data indicative of a speed at which to travel along the route.

In some embodiments, to obtain route data may comprise to obtain route data in which the route has been adjusted to reverse a direction of a cast perpendicular to the wind, in response to a lack of detection of gas after a threshold distance has been travelled.

According to another aspect of the present disclosure, a method may comprise obtaining, by a mobile compute device, route data indicative of a route to be traveled along to identify a location of a gas leak, and presenting, by the mobile compute device, the route data to a user to guide the user along the route.

In some embodiments, presenting the route data to the user may comprise displaying a map of a geographic area with the route overlaid onto the map.

In some embodiments, presenting the route data to the user may comprise displaying directional arrows to the user indicative of directions in which to travel along the route.

In some embodiments, presenting the route data may comprise emitting sounds or haptic signals indicative of instructions for traveling along the route.

In some embodiments, obtaining the route data may comprise obtaining route data produced based on search area data that is indicative of a geographic area in which a gas leak is detected.

In some embodiments, obtaining the route data may comprise producing the route data using the mobile computing device.

In some embodiments, obtaining the route data may comprise obtaining the route data from a remote computing device.

In some embodiments, obtaining the route data may comprise obtaining route data produced based on a surge-cast algorithm, a surge-spiral algorithm, or a raster scan algorithm.

In some embodiments, obtaining the route data may comprise obtaining route data produced based on a gas plume model.

In some embodiments, obtaining the route data may comprise obtaining route data that has been adjusted as a function of an environmental condition.

In some embodiments, obtaining route data that has been adjusted as a function of an environmental condition may comprise obtaining route data in which the route has been rotated based on a wind direction.

In some embodiments, obtaining the route data may comprise obtaining route data adjusted as a function of one or more objects present in an environment.

In some embodiments, obtaining route data adjusted as a function of one or more objects present in the environment may comprise obtaining route data adjusted to include at least a portion of a perimeter of a building.

In some embodiments, obtaining route data adjusted as a function of one or more objects present in the environment may comprise obtaining route data in which the route has been adjusted to follow an edge of a street.

In some embodiments, obtaining route data adjusted as a function of one or more objects present in the environment may comprise obtaining route data in which the route has been adjusted to follow at least a portion of a gas line or other gas management infrastructure.

In some embodiments, obtaining route data may comprise obtaining route data in which the route has been adjusted according to a surge-cast algorithm In some embodiments, obtaining route data may comprise obtaining route data in which the route has been adjusted to pause traversal of the route in response to a determination that a detected wind velocity satisfies a predefined threshold.

In some embodiments, obtaining route data may comprise obtaining route data in which the route has been adjusted to pause traversal of the route in response to a determination that a detected wind velocity is less than a predefined velocity.

In some embodiments, the method may further comprise determining whether the wind velocity satisfies the predefined threshold for a predefined time period; changing, in response to a determination that the wind velocity satisfied the predefined threshold for a predefined time period, the route from a route produced based on one algorithm to a route produced based on a second algorithm; and resuming, after changing the route, traversal of the route.

In some embodiments, changing the route may comprise changing the route from a route produced based on a surge-cast algorithm or a surge-spiral algorithm to a route produced based on a raster scan algorithm.

In some embodiments, the method may further comprise determining one or more changes in a direction of the wind over a time period, determining whether the one or more changes in the direction of the wind are stochastic, and pausing, in response to a determination that the one or more changes in the direction of the wind are stochastic, traversal of the route.

In some embodiments, the method may further comprise determining whether changes in the wind direction have remained stochastic for at least thirty seconds and changing, in response to a determination that the changes in the wind direction have remained stochastic for at least thirty seconds, the route from a route based on a surge-cast algorithm or a surge-spiral algorithm to a route based on a raster scan algorithm.

In some embodiments, the method may further comprise resuming traversal of the route after the route has been changed to a route based on a raster scan algorithm.

In some embodiments, the route may be within a search area, and the method may further comprise determining whether the location of the gas leak has been identified along the route and augmenting, in response to a determination that the location of the gas leak has been identified, the route to cover a remainder of the search area based on a raster scan algorithm.

In some embodiments, presenting the route data may comprise presenting data indicative of a speed at which to travel along the route.

In some embodiments, obtaining route data may comprise obtaining route data in which the route has been adjusted to reverse a direction of a cast perpendicular to the wind, in response to a lack of detection of gas after a threshold distance has been travelled.

According to yet another aspect of the present disclosure, one or more machine-readable storage media may comprise a plurality of instructions stored thereon that, in response to being executed, cause a mobile compute device to obtain route data indicative of a route to be traveled along to identify a location of a gas leak and to present the route data to a user to guide the user along the route.

In some embodiments, to present the route data to the user may comprise to display a map of a geographic area with the route overlaid onto the map.

In some embodiments, to present the route data to the user may comprise to display directional arrows to the user indicative of directions in which to travel along the route.

In some embodiments, to present the route data may comprise to emit sounds or haptic signals indicative of instructions for traveling along the route.

In some embodiments, to obtain the route data may comprise to obtain route data produced based on search area data that is indicative of a geographic area in which a gas leak is detected.

In some embodiments, the mobile compute device may be configured to produce the route data.

In some embodiments, the mobile compute device may be configured to obtain the route data from a remote compute device.

In some embodiments, to obtain the route data may comprise to obtain route data produced based on a surge-cast algorithm, a surge-spiral algorithm, or a raster scan algorithm.

In some embodiments, to obtain the route data may comprise to obtain route data produced based on a gas plume model.

In some embodiments, to obtain the route data may comprise to obtain route data that has been adjusted as a function of an environmental condition.

In some embodiments, to obtain route data that has been adjusted as a function of an environmental condition may comprise to obtain route data in which the route has been rotated based on a wind direction.

In some embodiments, to obtain the route data may comprise to obtain route data adjusted as a function of one or more objects present in an environment.

In some embodiments, to obtain route data adjusted as a function of one or more objects present in the environment may comprise to obtain route data adjusted to include at least a portion of a perimeter of a building.

In some embodiments, to obtain route data adjusted as a function of one or more objects present in the environment may comprise to obtain route data in which the route has been adjusted to follow an edge of a street.

In some embodiments, to obtain route data adjusted as a function of one or more objects present in the environment may comprise to obtain route data in which the route has been adjusted to follow at least a portion of a gas line or other gas management infrastructure.

In some embodiments, to obtain route data may comprise to obtain route data in which the route has been adjusted according to a surge-cast algorithm In some embodiments, to obtain route data may comprise to obtain route data in which the route has been adjusted to pause traversal of the route in response to a determination that a detected wind velocity satisfies a predefined threshold.

In some embodiments, to obtain route data may comprise to obtain route data in which the route has been adjusted to pause traversal of the route in response to a determination that a detected wind velocity is less than a predefined velocity.

In some embodiments, the plurality of instructions, when executed, may further cause the mobile compute device to determine whether the wind velocity satisfies the predefined threshold for a predefined time period; change, in response to a determination that the wind velocity satisfied the predefined threshold for a predefined time period, the route from a route produced based on one algorithm to a route produced based on a second algorithm; and resume, after changing the route, traversal of the route.

In some embodiments, to change the route may comprise to change the route from a route produced based on a surge-cast algorithm or a surge-spiral algorithm to a route produced based on a raster scan algorithm.

In some embodiments, the plurality of instructions, when executed, may further cause the mobile compute device to determine one or more changes in a direction of the wind over a time period, determine whether the one or more changes in the direction of the wind are stochastic, and pause, in response to a determination that the one or more changes in the direction of the wind are stochastic, traversal of the route.

In some embodiments, the plurality of instructions, when executed, may further cause the mobile compute device to determine whether changes in the wind direction have remained stochastic for at least thirty seconds and change, in response to a determination that the changes in the wind direction have remained stochastic for at least thirty seconds, the route from a route based on a surge-cast algorithm or a surge-spiral algorithm to a route based on a raster scan algorithm.

In some embodiments, the plurality of instructions, when executed, may further cause the mobile compute device to resume traversal of the route after the route has been changed to a route based on a raster scan algorithm.

In some embodiments, the route may be within a search area, and the plurality of instructions, when executed, may further cause the mobile compute device to determine whether the location of the gas leak has been identified along the route, and augment, in response to a determination that the location of the gas leak has been identified, the route to cover a remainder of the search area based on a raster scan algorithm.

In some embodiments, to present the route data may comprise to present data indicative of a speed at which to travel along the route.

In some embodiments, to obtain route data may comprise to obtain route data in which the route has been adjusted to reverse a direction of a cast perpendicular to the wind, in response to a lack of detection of gas after a threshold distance has been travelled.

According to still another aspect of the present disclosure, a method may comprise traversing, by an investigator and within a search area in which a probable gas leak has been indicated, a route defined according to at least one of a surge-cast algorithm or a surge-spiral algorithm, and sampling, with a gas detection device carried by the investigator, an environment along the route to identify a location of the gas leak.

In some embodiments, traversing the route may comprise traveling on a path that includes movement perpendicular to a wind direction until a presence of a target gas is detected and traveling, in response to the detection of the presence of the target gas, upwind until (i) the location of the gas leak is identified, (ii) a predefined distance has been travelled, or (iii) a detected amount of the target gas has decreased by a predefined amount or percentage.

In some embodiments, the method may further comprise traveling, in response to a determination that the predefined distance has been travelled without an identification of the location of the gas leak, to a previous position along the route.

In some embodiments, the method may further comprise traveling on a path that includes movement perpendicular to the wind direction in response to a determination that the detected amount of gas has decreased by the predefined amount or percentage.

In some embodiments, traversing the route may comprise traveling in a spiral pattern until a presence a target gas is detected and traveling, in response to the detection of the presence of the target gas, upwind until (i) the location of the gas leak is identified, (ii) a predefined distance has been travelled, or (iii) a detected amount of the target gas has decreased by a predefined amount or percentage.

In some embodiments, the method may further comprise traveling, in response to a determination that the predefined distance has been travelled without an identification of the location of the gas leak, to a previous position along the route.

In some embodiments, the method may further comprise traveling in a spiral pattern in response to a determination that the detected amount of gas has decreased by the predefined amount or percentage.

In some embodiments, the method may further comprise adjusting the route based on a gas plume model and traversing the adjusted route.

In some embodiments, traversing the route may comprise traveling in a first direction that includes movement perpendicular to a wind direction, determining whether a predefined distance has been travelled in the first direction without a detection of a predefined amount of a target gas, and traveling, in response to a determination that the predefined distance has been travelled without a detection of the predefined amount of the target gas, in a second direction that is opposite the first direction and includes movement perpendicular to the wind direction.

In some embodiments, the method may further comprise adjusting the route as a function of an environmental condition.

In some embodiments, the method may further comprise rotating the route based on a wind direction.

In some embodiments, the method may further comprise adjusting the route as a function of one or more objects present in the environment.

In some embodiments, adjusting the route may comprise adjusting the route to include at least a portion of a perimeter of a building.

In some embodiments, adjusting the route may comprise adjusting the route to follow an edge of a street.

In some embodiments, adjusting the route may comprise adjusting the route to follow at least a portion of a gas line or other gas management infrastructure.

In some embodiments, the method may further comprise pausing traversal of the route in response to a determination that a detected wind velocity satisfies a predefined threshold.

In some embodiments, the method may further comprise determining whether the wind velocity satisfies the predefined threshold for a predefined time period and changing, in response to a determination that the wind velocity satisfied the predefined threshold for a predefined time period, at least a portion of the route to follow a raster scan pattern.

In some embodiments, the method may further comprise determining one or more changes in a wind direction over a time period, determining whether the one or more changes in the wind direction are stochastic, and pausing, in response to a determination that the one or more changes in the wind direction are stochastic, traversal of the route.

In some embodiments, the method may further comprise determining whether changes in the wind direction have remained stochastic for at least thirty seconds and changing, in response to a determination that the changes in the wind direction have remained stochastic for at least thirty seconds, at least a portion of the route to follow a raster scan pattern.

In some embodiments, the method may further comprise determining whether the location of the gas leak has been identified along the route; augmenting, in response to a determination that the location of the gas leak has been identified, the route to cover a remainder of the search area based on a raster scan pattern; and traversing the augmented route while sampling the environment along the augmented route to locate an additional gas leak.

According to another aspect of the present disclosure, a system may comprise a gas detection device carried by an investigator and circuitry configured to direct the investigator along a route within a search area in which a probable gas leak has been indicated, the route being defined according to at least one of a surge-cast algorithm or a surge-spiral algorithm, and to sample, with the gas detection device, an environment along the route to identify a location of the gas leak.

In some embodiments, the circuitry may direct the investigator to travel a path that includes movement perpendicular to a wind direction until a presence of a target gas is detected and to travel, in response to the detection of the presence of the target gas, upwind until (i) the location of the gas leak is identified, (ii) a predefined distance has been travelled, or (iii) a detected amount of the target gas has decreased by a predefined amount or percentage.

In some embodiments, the circuitry may direct the investigator to travel, in response to a determination that the predefined distance has been travelled without an identification of the location of the gas leak, to a previous position along the route.

In some embodiments, the circuitry may direct the investigator to travel on a path that includes movement perpendicular to the wind direction in response to a determination that the detected amount of gas has decreased by the predefined amount or percentage.

In some embodiments, the circuitry may direct the investigator to travel in a spiral pattern until a presence a target gas is detected and to travel, in response to the detection of the presence of the target gas, upwind until (i) the location of the gas leak is identified, (ii) a predefined distance has been travelled, or (iii) a detected amount of the target gas has decreased by a predefined amount or percentage.

In some embodiments, the circuitry may direct the investigator to travel, in response to a determination that the predefined distance has been travelled without an identification of the location of the gas leak, to a previous position along the route.

In some embodiments, the circuitry may direct the investigator to travel in a spiral pattern in response to a determination that the detected amount of gas has decreased by the predefined amount or percentage.

In some embodiments, the circuitry may adjust the route based on a gas plume model, and the circuitry may direct the investigator to travel the adjusted route.

In some embodiments, the circuitry may direct the investigator to travel in a first direction that includes movement perpendicular to a wind direction. The circuitry may determine whether a predefined distance has been travelled in the first direction without a detection of a predefined amount of a target gas. The circuitry may further direct the investigator to travel, in response to a determination that the predefined distance has been travelled without a detection of the predefined amount of the target gas, in a second direction that is opposite the first direction and includes movement perpendicular to the wind direction.

In some embodiments, the circuitry may adjust the route as a function of an environmental condition.

In some embodiments, the circuitry may rotate the route based on a wind direction.

In some embodiments, the circuitry may adjust the route as a function of one or more objects present in the environment.

In some embodiments, the circuitry may adjust the route to include at least a portion of a perimeter of a building.

In some embodiments, the circuitry may adjust the route to follow an edge of a street.

In some embodiments, the circuitry may adjust the route to follow at least a portion of a gas line or other gas management infrastructure.

In some embodiments, the circuitry may direct the investigator to pause traversal of the route in response to a determination that a detected wind velocity satisfies a predefined threshold.

In some embodiments, the circuitry may further determine whether the wind velocity satisfies the predefined threshold for a predefined time period and change, in response to a determination that the wind velocity satisfied the predefined threshold for a predefined time period, at least a portion of the route to follow a raster scan pattern.

In some embodiments, the circuitry may further determine one or more changes in a wind direction over a time period. The circuitry may determine whether the one or more changes in the wind direction are stochastic. The circuitry may direct the investigator to pause, in response to a determination that the one or more changes in the wind direction are stochastic, traversal of the route.

In some embodiments, the circuitry may further determine whether changes in the wind direction have remained stochastic for at least thirty seconds and change, in response to a determination that the changes in the wind direction have remained stochastic for at least thirty seconds, at least a portion of the route to follow a raster scan pattern.

In some embodiments, the circuitry may further determine whether the location of the gas leak has been identified along the route. The circuitry may augment, in response to a determination that the location of the gas leak has been identified, the route to cover a remainder of the search area based on a raster scan pattern. The circuitry may direct the investigator to traverse the augmented route while sampling the environment along the augmented route to locate an additional gas leak.

According to yet another aspect of the present disclosure, one or more machine-readable storage media may comprise a plurality of instructions stored thereon that, in response to being executed, cause an investigator to traverse, within a search area in which a probable gas leak has been indicated, a route defined according to at least one of a surge-cast algorithm or a surge-spiral algorithm and to sample, with a gas detection device carried by the investigator, an environment along the route to identify a location of the gas leak.

In some embodiments, the plurality of instructions, when executed, may cause the investigator to travel a path that includes movement perpendicular to a wind direction until a presence of a target gas is detected and to travel, in response to the detection of the presence of the target gas, upwind until (i) the location of the gas leak is identified, (ii) a predefined distance has been travelled, or (iii) a detected amount of the target gas has decreased by a predefined amount or percentage.

In some embodiments, the plurality of instructions, when executed, may cause the investigator to travel, in response to a determination that the predefined distance has been travelled without an identification of the location of the gas leak, to a previous position along the route.

In some embodiments, the plurality of instructions, when executed, may cause the investigator to travel on a path that includes movement perpendicular to the wind direction in response to a determination that the detected amount of gas has decreased by the predefined amount or percentage.

In some embodiments, the plurality of instructions, when executed, may cause the investigator to travel in a spiral pattern until a presence a target gas is detected and to travel, in response to the detection of the presence of the target gas, upwind until (i) the location of the gas leak is identified, (ii) a predefined distance has been travelled, or (iii) a detected amount of the target gas has decreased by a predefined amount or percentage.

In some embodiments, the plurality of instructions, when executed, may cause the investigator to travel, in response to a determination that the predefined distance has been travelled without an identification of the location of the gas leak, to a previous position along the route.

In some embodiments, the plurality of instructions, when executed, may cause the investigator to travel in a spiral pattern in response to a determination that the detected amount of gas has decreased by the predefined amount or percentage.

In some embodiments, the plurality of instructions, when executed, may adjust the route based on a gas plume model and may direct the investigator to travel the adjusted route.

In some embodiments, the plurality of instructions, when executed, may direct the investigator to travel in a first direction that includes movement perpendicular to a wind direction. The plurality of instructions, when executed, may determine whether a predefined distance has been travelled in the first direction without a detection of a predefined amount of a target gas. The plurality of instructions, when executed, may further direct the investigator to travel, in response to a determination that the predefined distance has been travelled without a detection of the predefined amount of the target gas, in a second direction that is opposite the first direction and includes movement perpendicular to the wind direction.

In some embodiments, the plurality of instructions, when executed, may adjust the route as a function of an environmental condition.

In some embodiments, the plurality of instructions, when executed, may rotate the route based on a wind direction.

In some embodiments, the plurality of instructions, when executed, may adjust the route as a function of one or more objects present in the environment.

In some embodiments, the plurality of instructions, when executed, may adjust the route to include at least a portion of a perimeter of a building.

In some embodiments, the plurality of instructions, when executed, may adjust the route to follow an edge of a street.

In some embodiments, the plurality of instructions, when executed, may adjust the route to follow at least a portion of a gas line or other gas management infrastructure.

In some embodiments, the plurality of instructions, when executed, may direct the investigator to pause traversal of the route in response to a determination that a detected wind velocity satisfies a predefined threshold.

In some embodiments, the plurality of instructions, when executed, may further determine whether the wind velocity satisfies the predefined threshold for a predefined time period and change, in response to a determination that the wind velocity satisfied the predefined threshold for a predefined time period, at least a portion of the route to follow a raster scan pattern.

In some embodiments, the plurality of instructions, when executed, may further determine one or more changes in a wind direction over a time period. The plurality of instructions, when executed, may determine whether the one or more changes in the wind direction are stochastic. The plurality of instructions, when executed, may direct the investigator to pause, in response to a determination that the one or more changes in the wind direction are stochastic, traversal of the route.

In some embodiments, the plurality of instructions, when executed, may further determine whether changes in the wind direction have remained stochastic for at least thirty seconds and change, in response to a determination that the changes in the wind direction have remained stochastic for at least thirty seconds, at least a portion of the route to follow a raster scan pattern.

In some embodiments, the plurality of instructions, when executed, may further determine whether the location of the gas leak has been identified along the route. The plurality of instructions, when executed, may augment, in response to a determination that the location of the gas leak has been identified, the route to cover a remainder of the search area based on a raster scan pattern. The plurality of instructions, when executed, may direct the investigator to traverse the augmented route while sampling the environment along the augmented route to locate an additional gas leak.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
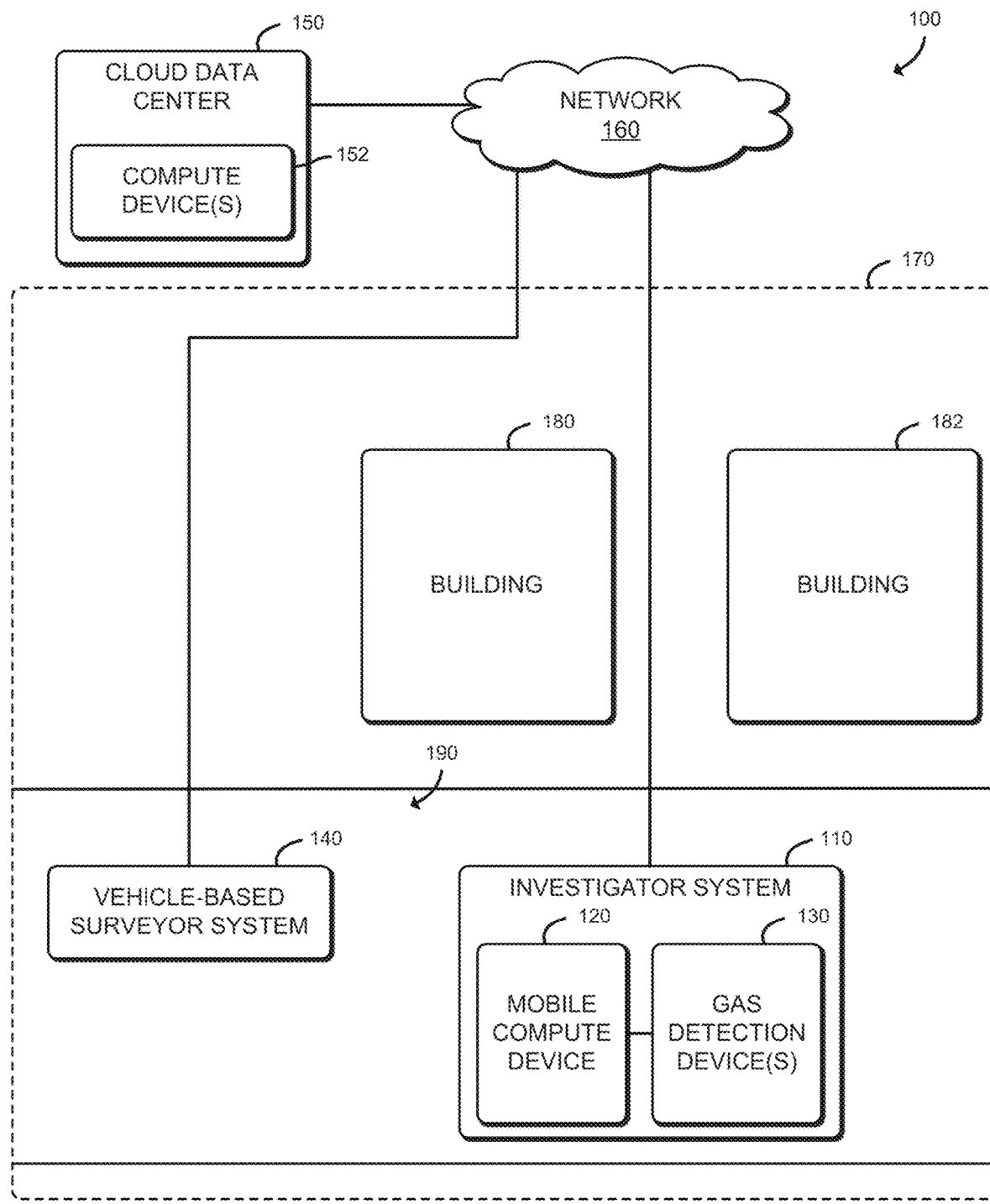
FIG. 1 is a simplified block diagram of at least one embodiment of a system for producing efficient investigation routes for identifying gas leak locations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for producing efficient investigation routes for identifying gas leak locations includes, in the illustrative embodiment, an investigator system 110, a vehicle-based surveyor system 140, and a cloud data center 150 having one or more compute devices 152. In operation, the vehicle-based surveyor system 140, which may be embodied as an advanced leak detection system (ALDS) traverses a path through a geographic area 170, such as a street 190, and determines whether a target gas (e.g., natural gas or other gas to be detected) is present in the atmosphere at a threshold level (e.g., a density, such as a defined parts per million or parts per billion) indicative of the presence of a gas leak (e.g., a natural gas leak). In response to a determination that a gas leak is present, the system 100 (e.g., the vehicle-based surveyor system 140) defines a geographic area in which the investigator system 110 should be used to pinpoint the location of the gas leak.

The investigator system 110, in the illustrative embodiment, is carried by, mounted to, or integrated into an investigator (e.g., a human, or another user, such as a robot, autonomous vehicle, etc.) assigned to traverse a route based on the defined geographic area, to identify the location of the gas leak, and includes a mobile compute device 120 in communication (e.g., wired or wireless communication) with one or more gas detection devices 130. The gas detection devices 130 may be embodied as any one or more devices capable of detecting the presence of a target gas (e.g., natural gas or another gas to be detected) in an environment. In the illustrative embodiment, the gas detection devices 130 include a handheld sampling device (e.g., a "wand") configured to obtain air samples in a vicinity of the user (e.g., the investigator) and provide the samples to a gas analysis device (e.g., a spectroscopy analysis device carried on the back of the investigator and connected the handheld sampling device through a tube) to detect the presence and amount (e.g., parts per million, parts per billion, etc.) of one or more defined gases (e.g., methane, ethane, etc.) in the samples. The vehicle-based surveyor system 140 may have gas detection device(s) similar to the gas detection device(s) 130, but may be different in physical size, air sampling capacity, sensitivity and/or other aspects due to being designed for use with a vehicle (e.g., an automobile) rather than being carried by a person.

In operation, the mobile compute device 120 presents (e.g., visually, audibly, haptically, electronically, etc.), to the user (e.g., the investigator), directions for traversing (e.g., walking, or otherwise traveling along) the route to efficiently determine the location of the gas leak. In some embodiments, the mobile compute device 120 may locally determine the route (e.g., based on the defined geographic area resulting from the gas leak detection from the vehicle-based surveyor system 140) or may obtain the route from the cloud data center 150. The route is determined according to one or more algorithms known to reduce the amount of time needed to identify the location of a gas leak, such as a surge-cast algorithm, a surge-spiral algorithm, a raster scan algorithm, and/or a gas plume modeling algorithm. Furthermore, the route may be adjusted (e.g., by the cloud data center 150 and/or locally by the mobile compute device 120) based on conditions and/or objects present in the environment, such as wind direction and speed, structures such as buildings and streets, which may affect the propagation of gas particles and/or present obstacles in the route, known locations of gas lines or other gas management infrastructure (e.g., from a database having data indicative of locations of gas lines, compression stations, storage tanks, or other gas management infrastructure), and detections of gas in the environment (e.g., from the gas detection device(s) 130) as the route is traversed. The system 100 also includes fail-safes to lower the likelihood of a user losing a gas plume once one is initially detected. For example, the system 100 may pause traversal of a route if the wind direction is determined to be stochastic (e.g., having a random probability distribution or pattern that may be analyzed statistically but may not be predicted precisely) or if the wind velocity is relatively low (e.g., less than a predefined velocity) and resuming traversal of the route in a raster scan pattern if the wind direction remains stochastic for a predefined amount of time (e.g., 30 seconds) and/or if the wind velocity remains relatively low for that predefined amount of time. Additionally, the system 100 may augment a route to cover a remaining unexplored portion of a search route after the source of a leak has been located, to identify potential additional leaks (e.g., using a raster scan or half raster scan pattern). As such, compared to typical systems in which the determination of the location of a gas leak is time consuming and highly dependent on the methods of the individual investigator assigned to determine the location of a gas leak, the system 100 provides increased consistency, faster investigation speed, and a higher success rate in finding a gas leak.

Figure 2:
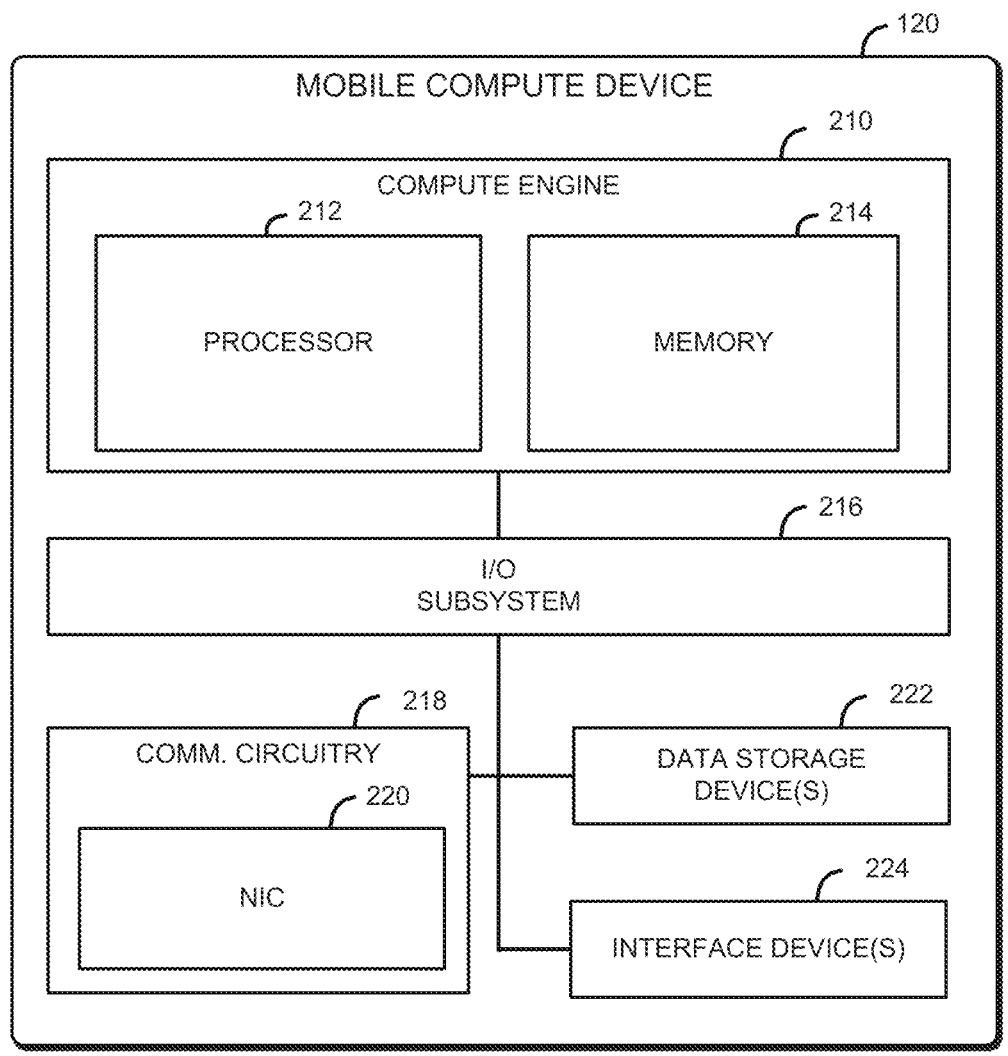
FIG. 2 is a simplified block diagram of at least one embodiment of a mobile compute device of the system of FIG. 1.

Referring now to FIG. 2, the illustrative mobile compute device 120 includes a compute engine 210, an input/output (I/O) subsystem 216, communication circuitry 218, a data storage subsystem 222, and one or more interface devices 224. Of course, in other embodiments, the mobile compute device 120 may include other or additional components, such as those commonly found in a computer (e.g., a mouse, a keyboard, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as route data indicative of a route to be traveled along by an investigator using the mobile compute device 120, one or more route determination algorithms, wind data indicative of a wind direction and speed, data indicative of locations of objects in a geographic area, such as locations of streets, buildings, and/or gas lines, gas detection data indicative of whether a predefined amount of a target gas (e.g., natural gas or another gas to be detected) has been detected by gas detection device(s) (e.g., the gas detection device(s) 130) in communication with the mobile compute device 120, applications, programs, libraries, and drivers.

The compute engine 210 is communicatively coupled to other components of the mobile compute device 120 via the I/O subsystem 216, which may be embodied as circuitry and/or components to facilitate input/output operations with the compute engine 210 (e.g., with the processor 212 and the main memory 214) and other components of the mobile compute device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the mobile compute device 120, into the compute engine 210.

The communication circuitry 218 may be embodied as any communication circuit, device, or collection thereof, capable of enabling communications over a network between the mobile compute device 120 and another device (e.g., the gas detection device(s) 130, the compute device(s) 152 of the cloud data center 150, the vehicle-based surveyor system 140, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the mobile compute device 120 to connect with another compute device (e.g., the gas detection device(s) 130, the compute device(s) 152 of the cloud data center 150, the vehicle-based surveyor system 140, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the mobile compute device 120 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems. The interface device(s) 224 may be embodied as any devices configured to enable the mobile compute device 120 to provide information to or obtain information from the user of the mobile compute device 120 and/or the environment. In the illustrative embodiment, the interface device(s) 224 include one or more devices for providing visual information, such as a graphical display (e.g., a liquid crystal display (LCD), a light emitting diode (LED) display, etc.) or one or more lights located on the mobile compute device (e.g., LEDs arranged around the mobile compute device 120 that may illuminate to indicate a direction in which to travel). The interface device(s) 224 may additionally include one or more devices configured to output audible information, such as a speaker that may output speech (e.g., audible verbal instructions to guide the user along a route) or other noises (e.g., sounds having a frequency indicative of a corresponding instruction for guiding the user along a route). The interface device(s) 224 may also include input devices, such as a microphone, a camera, a touch screen, button(s), and/or other devices capable of obtaining information and providing it to the compute engine 210.

The vehicle-based surveyor system 140, the compute device(s) 152, and the gas detection devices 130, may have components similar to those described in FIG. 2 with reference to the mobile compute device 120. The description of those components of the mobile compute device 120 is equally applicable to the description of components of the vehicle-based surveyor system 140, the compute device(s) 152, and the gas detection device(s) 130. Further, it should be appreciated that any of the devices 120, 140, 152, 130 may include other components, sub-components, and devices commonly found in a computing device, which are not discussed above in reference to the mobile compute device 120 and not discussed herein for clarity of the description. Furthermore, in some embodiments, the mobile compute device 120 and the gas detection device(s) 130 may be combined into a single unit.

In the illustrative embodiment, the investigator system 110, the vehicle-based surveyor system 140, and the cloud data center 150 are in communication via a network 160, which may be embodied as any type of wired or wireless communication network, including global networks (e.g., the internet), cellular networks (e.g., Global System for Mobile Communications (GSM), Long Term Evolution (LTE), Worldwide Interoperability for Microwave Access (WiMAX), 3G, 4G, 5G, etc.), a radio area network (RAN), local area networks (LANs) or wide area networks (WANs), digital subscriber line (DSL) networks, cable networks (e.g., coaxial networks, fiber networks, etc.), or any combination thereof.

Figure 3:
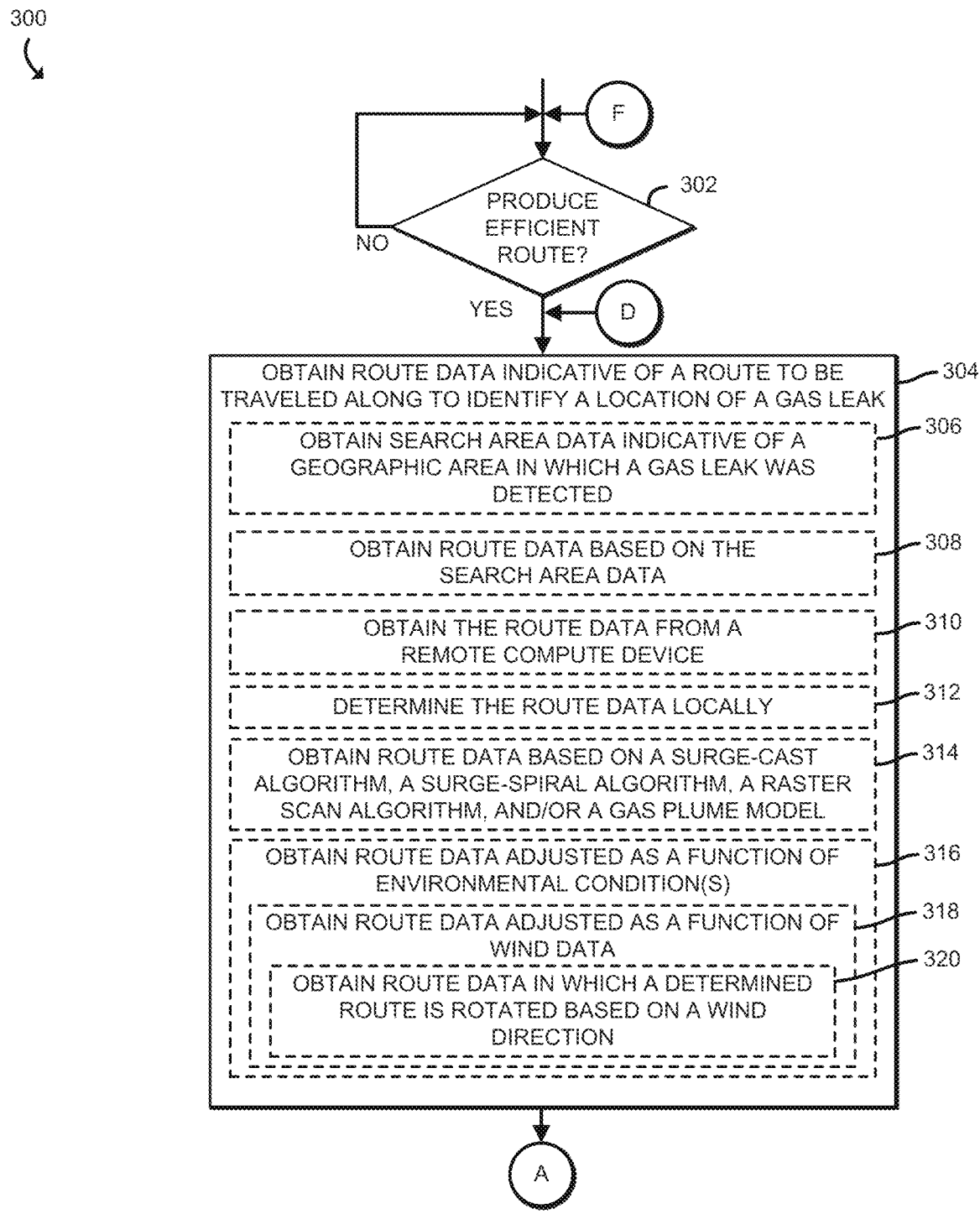
FIGS. 3-7 are simplified block diagrams of at least one embodiment of a method for producing efficient investigation routes for identifying gas leak locations that may be performed by the system of FIG. 1.

Referring now to FIG. 3, the system 100 (e.g., the mobile compute device 120 of the investigator system 110), in the illustrative embodiment, may perform a method 300 for producing an efficient investigation route for identifying a gas leak location. The method 300 begins with block 302, in which the system 100 (e.g., the mobile compute device 120) determines whether to produce an efficient route (i.e., an investigation route) for identifying a gas leak location. In the illustrative embodiment, the mobile compute device 120 may determine to produce an efficient route in response to a request to do so (e.g., from a user of the mobile compute device 120 or from another computer, such as a compute device 152 of the cloud data center 150), in response to determining that a configuration setting (e.g., in a configuration file in the data storage 222) indicates to enable the production of an efficient route, and/or based on other factors. Regardless, in response to a determination to produce an efficient route, the method 300, in the illustrative embodiment, advances to block 304, in which the system 100 (e.g., the mobile compute device 120) obtains route data indicative of a route to be traveled along to identify a location of a gas leak. In doing so, and as indicated in block 306, the mobile compute device 120 may obtain search area data indicative of a geographic area in which a gas leak was detected (e.g., detected by the vehicle-based surveyor system 140). The mobile compute device 120 may obtain the search area data from the cloud data center 150 (which may have received it from the vehicle-based surveyor system 140) or may obtain the search area data directly from the vehicle-based surveyor system.

As indicated in block 308, the mobile compute device 120, in the illustrative embodiment, obtains route data that is based on the search area data. The route data may be embodied as any data that indicates a route to be traveled along (e.g., by the investigator using the investigator system 110) to identify the source of the leak (e.g., in the search area defined by the search area data). In some embodiments, the route may extend outside of the search area and/or the search area may change over time. The mobile compute device 120 may obtain the route data from a remote compute device, such as a compute device 152 of the cloud data center 150 (e.g., via the network 160), as indicated in block 310. In other embodiments, the mobile compute device 120 may determine the route data locally (e.g., calculate the route data by executing a route determination algorithm with the compute engine 210), as indicated in block 312. In obtaining data indicative of a route, the mobile compute device 120 may obtain data indicative of a portion of a route, and obtain, subsequently (e.g., from a remote compute device or by calculating locally) one or more additional portions of the route. As indicated in block 314, the mobile compute device 120 may obtain route data based on a surge-cast algorithm, a surge-spiral algorithm, a raster scan algorithm, and/or a gas plume model.

Figure 8:
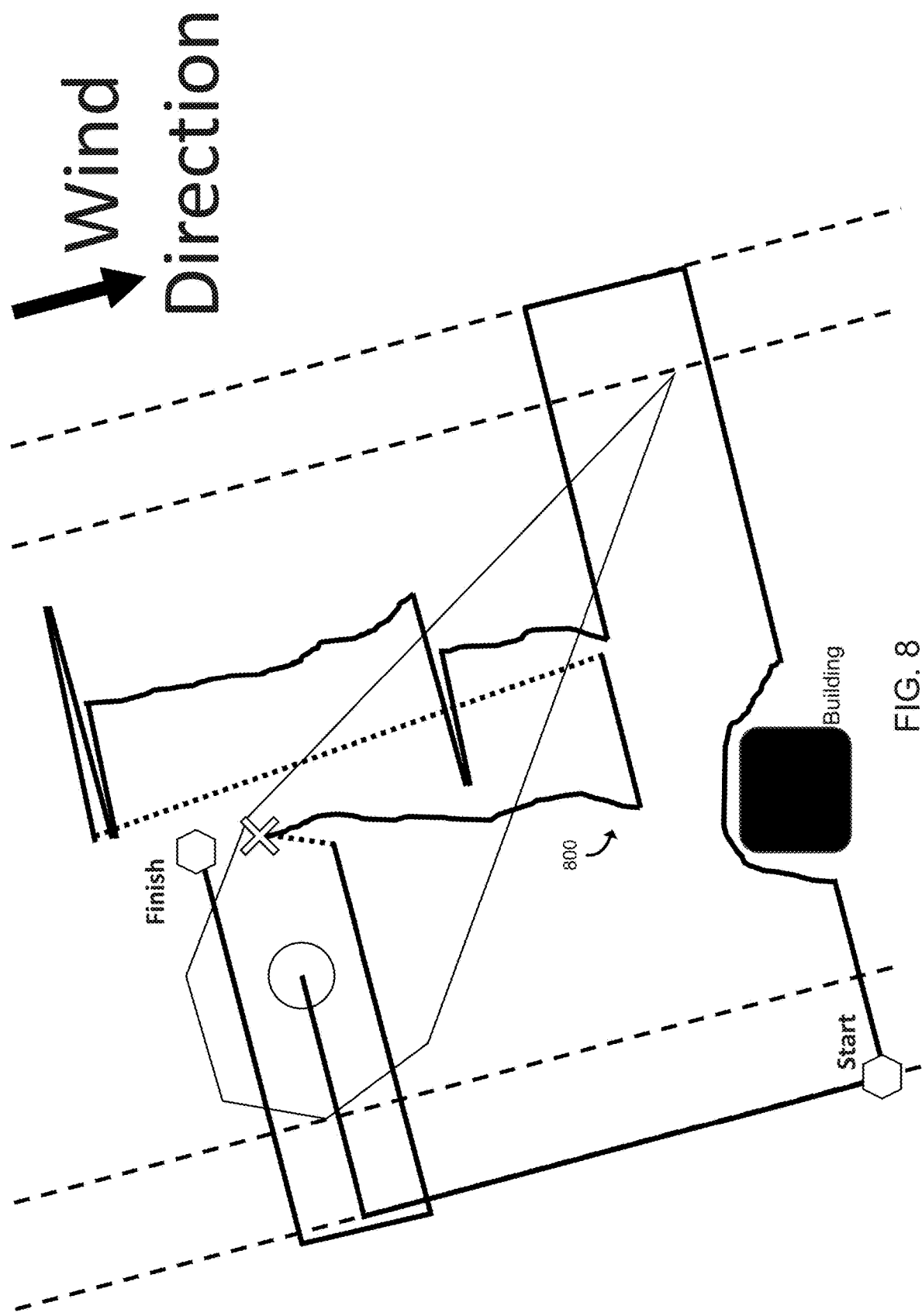
FIG. 8 is a simplified diagram of an investigation route generated by the system of FIG. 1 based on a surge-cast algorithm.
Figure 9:
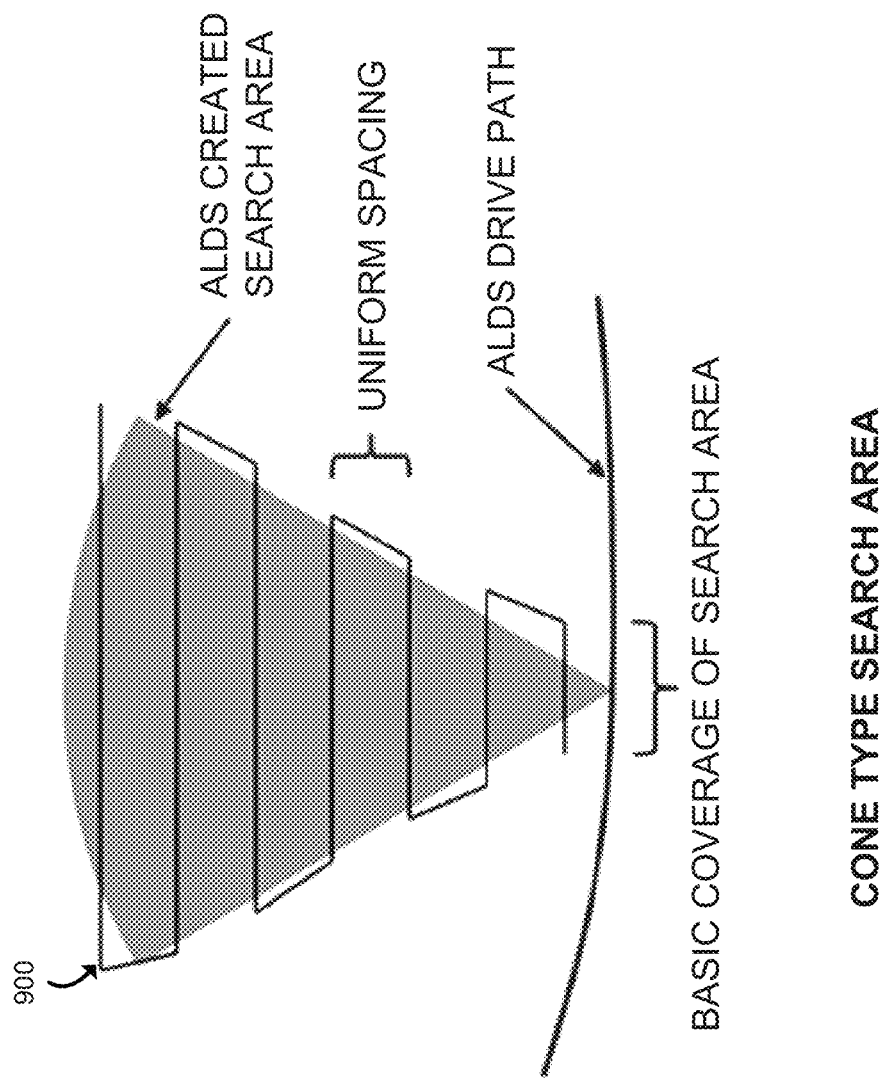
FIGS. 9-11 are simplified diagrams of investigation routes generated by the system of FIG. 1 based on a raster scan algorithm.
Figure 10:
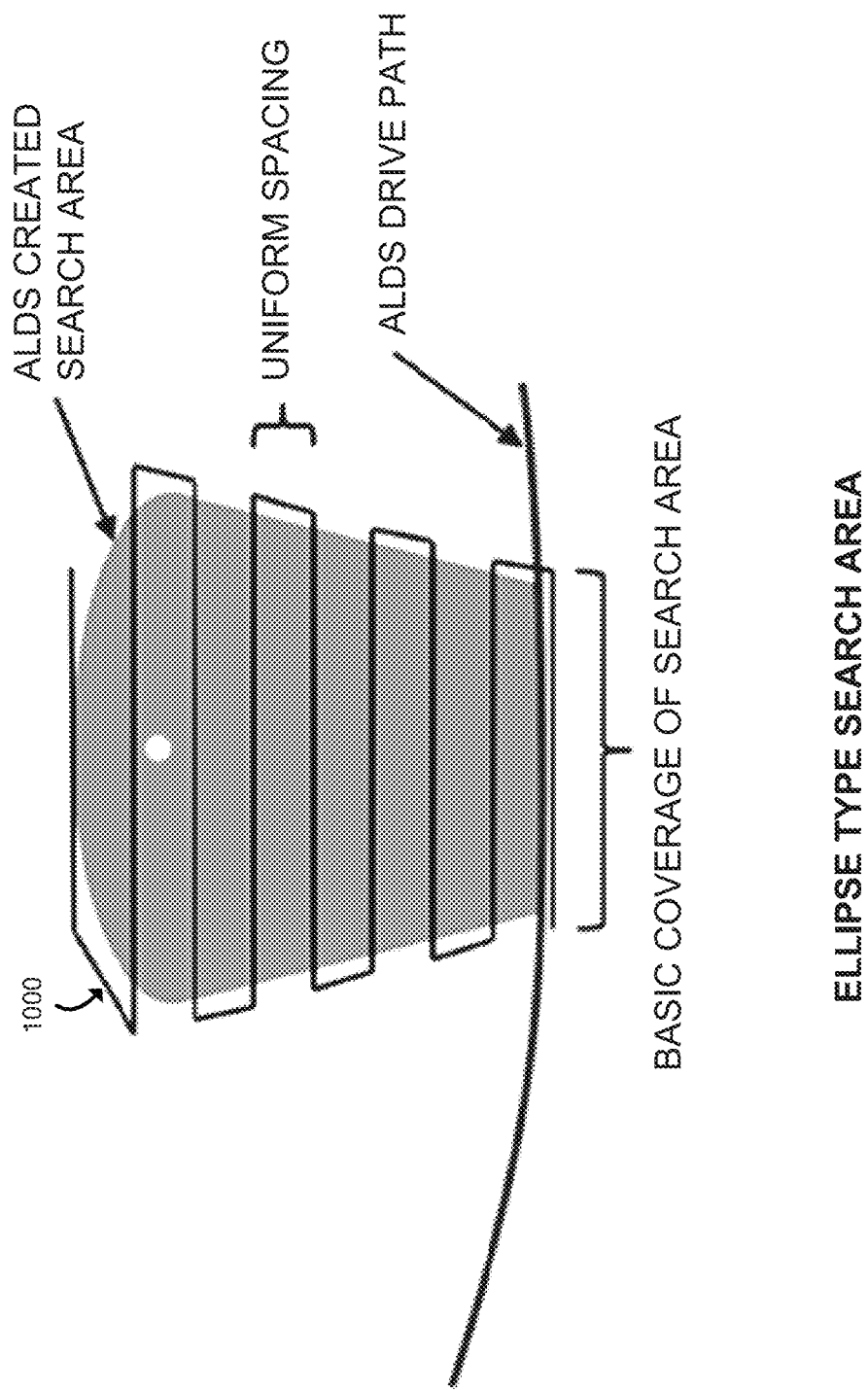
Figure 11:
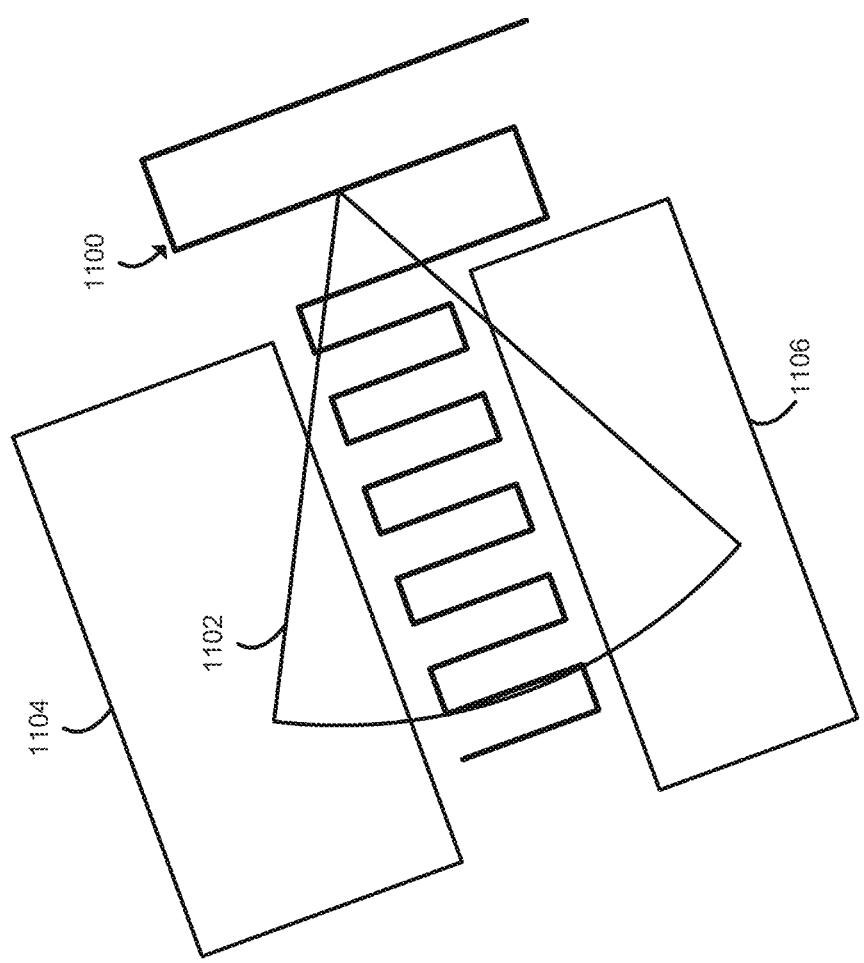
Figure 12:
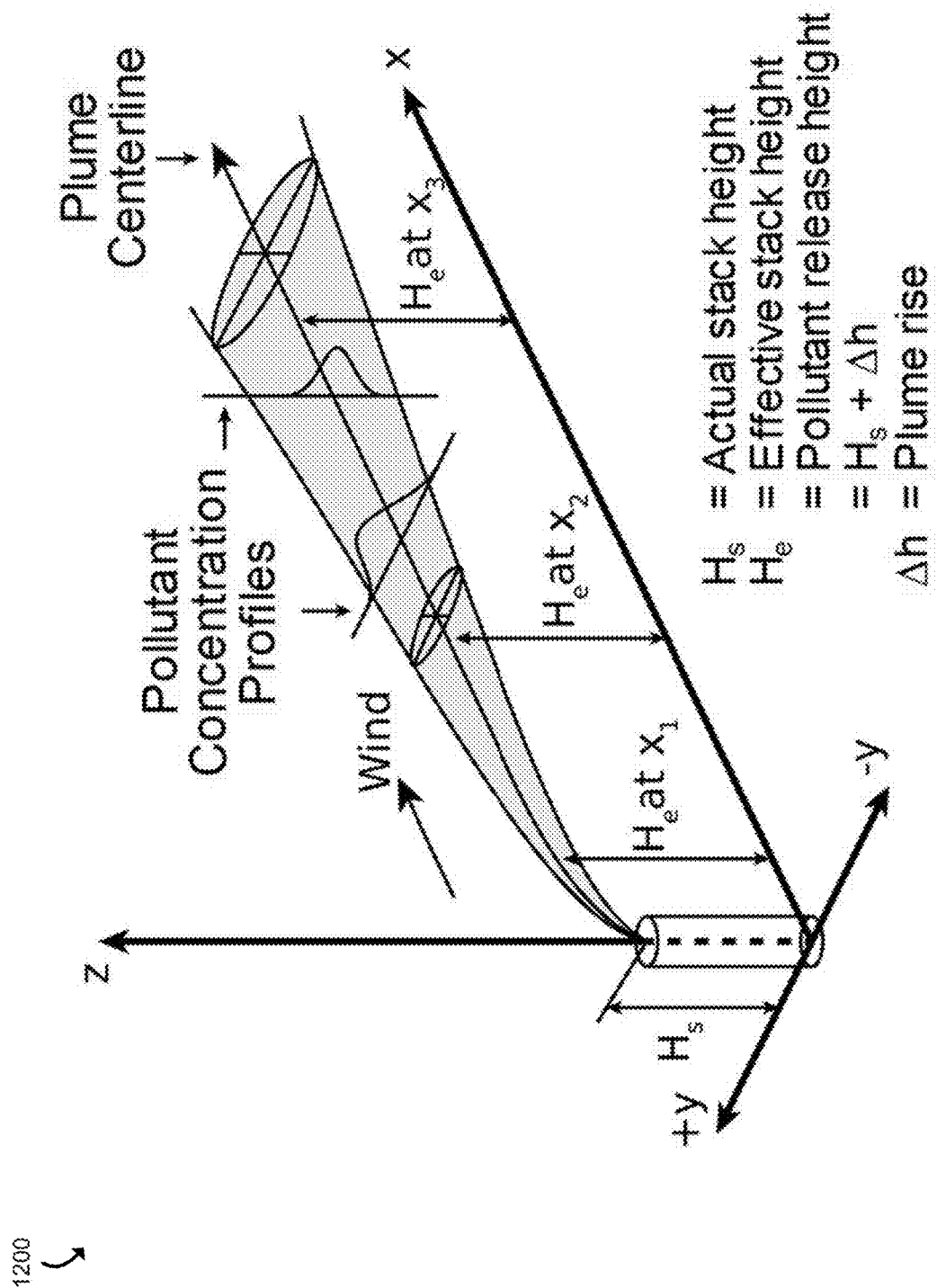
FIG. 12 is a simplified diagram of a gas plume model that may be used by the system of FIG. 1 to model the shape of a natural gas plume.

In a surge-cast algorithm, the route proceeds ("casts") perpendicular to the direction of the wind until the presence of a target gas (e.g., natural gas or another gas) is detected (e.g., by the gas detection device(s) 130), at which point the route turns and proceeds ("surges") into the wind until the location of the gas leak is identified or until a threshold distance has been travelled or the detected amount of gas has decreased by a predefined amount or percentage. If the location of the gas leak is not identified as a result of a surge, the route turns again and proceeds ("casts") perpendicular to the wind or returns to a previous location in the route (e.g., a location in the route before the surge occurred). If a cast proceeds for a predefined distance (e.g., according to a determined route) without a detection of the gas, the route may subsequently cast in the opposite direction (e.g., 180 degrees from the earlier direction). The surge-cast algorithm is based on insect odor tracking behavior and has been shown empirically to significantly reduce the time needed to identify the location of a gas leak, as compared to other methods. A diagram of a route 800 based on a search-cast algorithm is shown in FIG. 8. In a surge-spiral algorithm, the route surges into the wind when gas is detected and otherwise proceeds in a spiral shape, rather that casting perpendicular to the wind. In a raster scan algorithm, the route proceeds along uniformly spaced (e.g., spaced based on a radius of an area that the gas detection device(s) 130 are capable of detecting gas in) line segments that cover the search area defined in the search area data (e.g., from block 308). A route 900 based on a raster scan algorithm for a cone-shaped search area is shown in FIG. 9 and a route 1000 based on a raster scan algorithm for an ellipse-shaped search area is shown in FIG. 10. Another route 1100, shown in FIG. 11, is based on a raster scan algorithm for a cone shaped search area 1102, but is adjusted to account for the locations of objects (e.g., buildings 1104, 1106) in the environment. That is, the route 1100 is adjusted to narrow the lengths of line segments located between two buildings 1104, 1106 as those buildings 1104, 1106 pose obstacles to the investigator. Further, a gas plume model 1200, which describes the shape of a gas plume, is represented in FIG. 12. In the gas plume model 1200, the source expands in a cone, the cross section is Gaussian, and the gas concentration decreases with distance and with wind speed.

As indicated in block 316, the mobile compute device 120 may obtain (e.g., receive from a remote compute device 152 or calculate locally) route data that has been adjusted as a function of (e.g., based on) one or more environmental conditions. For example, and as indicated in block 318, the mobile compute device 120 may obtain route data that has been adjusted as a function of wind data (e.g., data indicative of a direction of wind present in the environment). As indicated in block 320, the mobile compute device 120 may obtain route data in which a determined route is rotated based on the wind direction indicated in the wind data (e.g., to cause a surge to proceed into the wind and to cause a cast to be directed perpendicular to the wind).

Figure 4:
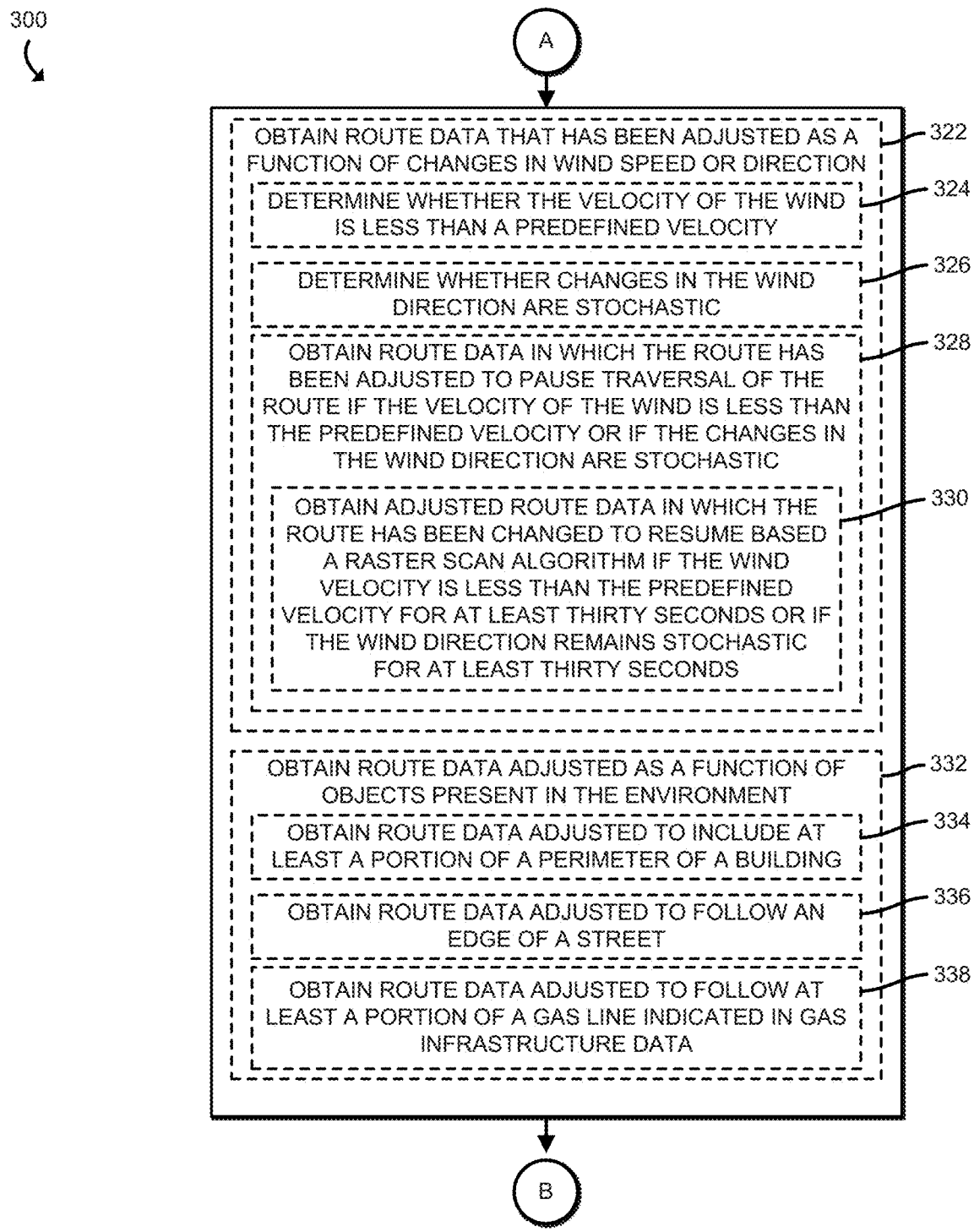

Referring now to FIG. 4, and as indicated in block 322, the mobile compute device 120 may obtain route data that has been adjusted as a function of changes in wind speed or direction. For example, and as indicated in lock 324, the mobile compute device 120 may determine whether the velocity of the wind is less than a predefined velocity (e.g., one mile per hour), as indicated in block 324. Additionally or alternatively, the mobile compute device 120 may determine whether changes in the wind direction (e.g., over a particular time period, such as thirty seconds) are stochastic (e.g., having a random probability distribution or pattern that may be analyzed statistically but may not be predicted precisely), as indicated in block 326. As indicated in block 328, the mobile compute device 120 may obtain route data in which the route has been adjusted to pause traversal of the route if the velocity of the wind is less than the predefined velocity or if the changes in the wind direction are determined to be stochastic. Further, and as indicated in block 330, the mobile compute device 120 may obtain adjusted route data in which the route has been changed to resume traversal of the route, based on a raster scan algorithm (e.g., potentially switching from another algorithm, such as a surge-cast or surge-spiral algorithm), if the wind velocity is less than the predefined velocity for a predefined amount of time (e.g., at least thirty seconds) and/or if the wind direction remains stochastic for the predefined amount of time (e.g., at least thirty seconds).

As indicated in block 332, the mobile compute device 120 may obtain route data (e.g., from another compute device, such as a compute device 152 of the cloud data center 150, or produced locally on the mobile compute device 120) that is adjusted (e.g., an original route is modified, extended, shortened, etc.) as a function of objects present in the environment (e.g., in the geographic area associated with the search area data from block 306). As such, the mobile compute device 120 may obtain route data based on the type of object, the geometry of the object (e.g., size, shape, etc.), and/or other factors. In doing so, the mobile compute device 120 may obtain route data adjusted to include a least a portion of a perimeter of a building (e.g., to route around the building), as indicated in block 334. As indicated in block 336, the mobile compute device 120 may obtain route data adjusted to follow (e.g., include) an edge of a street, as gas emissions from a leak in a gas line under a street often migrate to the edge of the street before rising into the atmosphere. In some embodiments, the mobile compute device 120 may obtain route data adjusted to follow at least a portion of a gas line or other gas management infrastructure indicated in gas infrastructure data (e.g., gas line data from a database that indicates locations of gas lines and other gas management infrastructure in the geographic area), as indicated in block 338.

Figure 5:
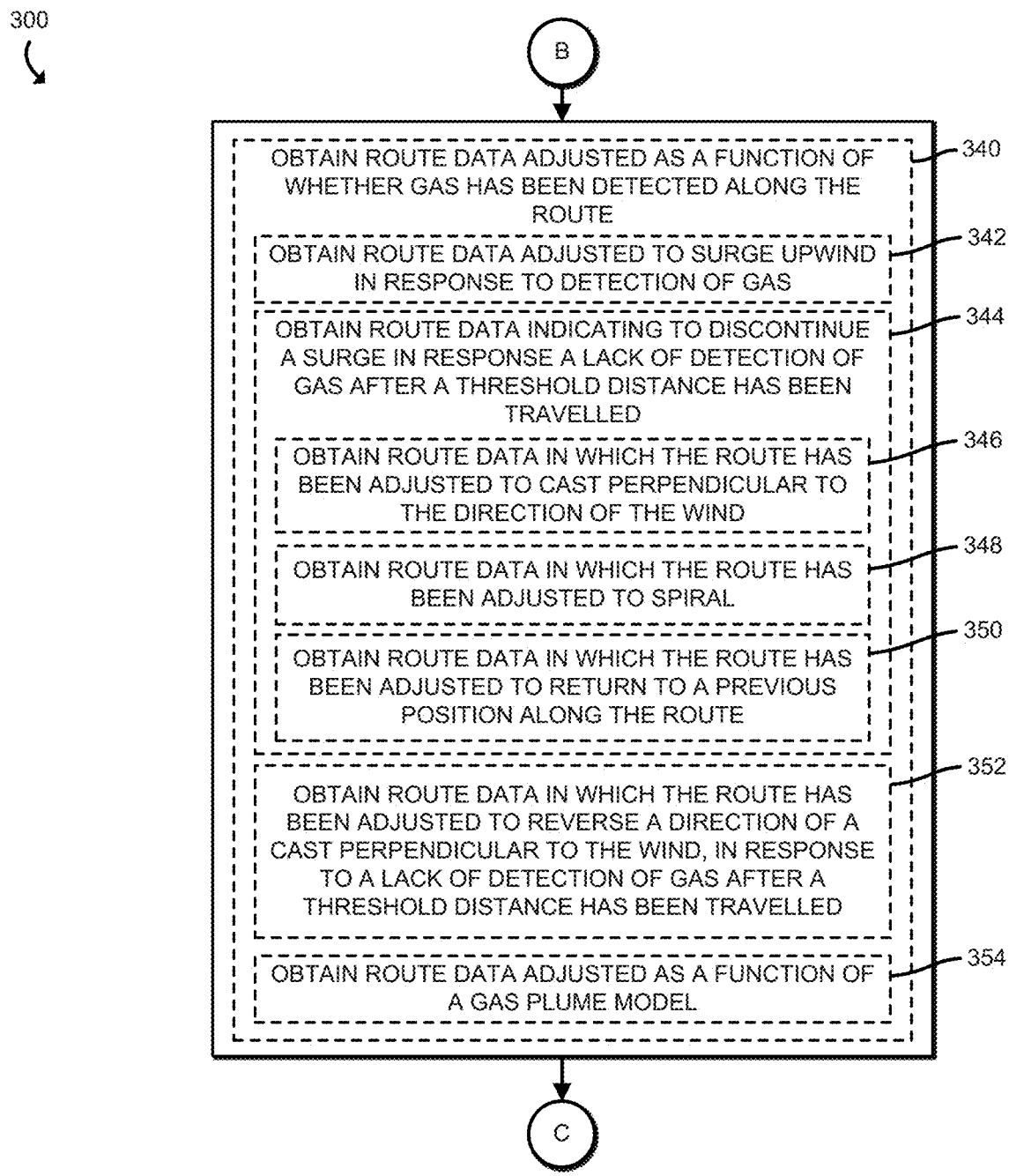

Referring now to FIG. 5, and as indicated in block 340, the mobile compute device 120 may obtain route data adjusted (e.g., modified, extended, shortened, etc.) as a function of whether a target gas (e.g., natural gas or another gas to be detected) has been detected (e.g., by the gas detection device(s) 130) along the route (e.g., by obtaining the adjusted route data from another compute device, such as a compute device 152 of the cloud data center 150 or by producing the adjusted route data locally on the mobile compute device 120). In doing so, and as indicated in block 342, the mobile compute device 120 may obtain route data adjusted to surge upwind (i.e., against the wind) in response to detection of gas (e.g., as part of a surge-cast or surge-spiral route). Conversely, the mobile compute device 120 may obtain route data indicating to discontinue (e.g., stop) a surge in response to a lack of detection of gas after a threshold distance (e.g., a predefined distance) has been travelled (e.g., in a surge), as indicated in block 344. In doing so, and as indicated in block 346, the mobile compute device 120 may obtain route data in which the route has been adjusted to cast perpendicular to the direction of the wind. Alternatively, and as indicated in block 348, the mobile compute device 120 may obtain route data in which the route has been adjusted to spiral (e.g., to follow a spiral pattern). In some embodiments, the mobile compute device 120 may obtain route data in which the route has been adjusted to return to a previous position along the route (e.g., a position prior to a surge), as indicated in block 350. As indicated in block 352, the mobile compute device 120, in some embodiments, may obtain route data in which the route has been adjusted to reverse a direction of a cast (e.g., proceed 180 degrees from the earlier direction) in response to a lack of detection of gas after a predefined threshold distance has been travelled (e.g., in a cast perpendicular to the wind). The mobile compute device 120, in some embodiments, may obtain route data in which the route has been adjusted as a function of a gas plume model (e.g., the gas plume model 1200 of FIG. 12) to lead the investigator to the location of the source of the gas leak according to the gas plume model, as indicated in block 354. Subsequently, the method 300 advances to block 356 of FIG. 6, in which the mobile compute device 120 presents the route data to a user (e.g., a human investigator holding the mobile compute device 120, or a non-human investigator, such as a robot or autonomous vehicle, etc. equipped with the mobile compute device 120) to guide the user along the route.

Figure 6:
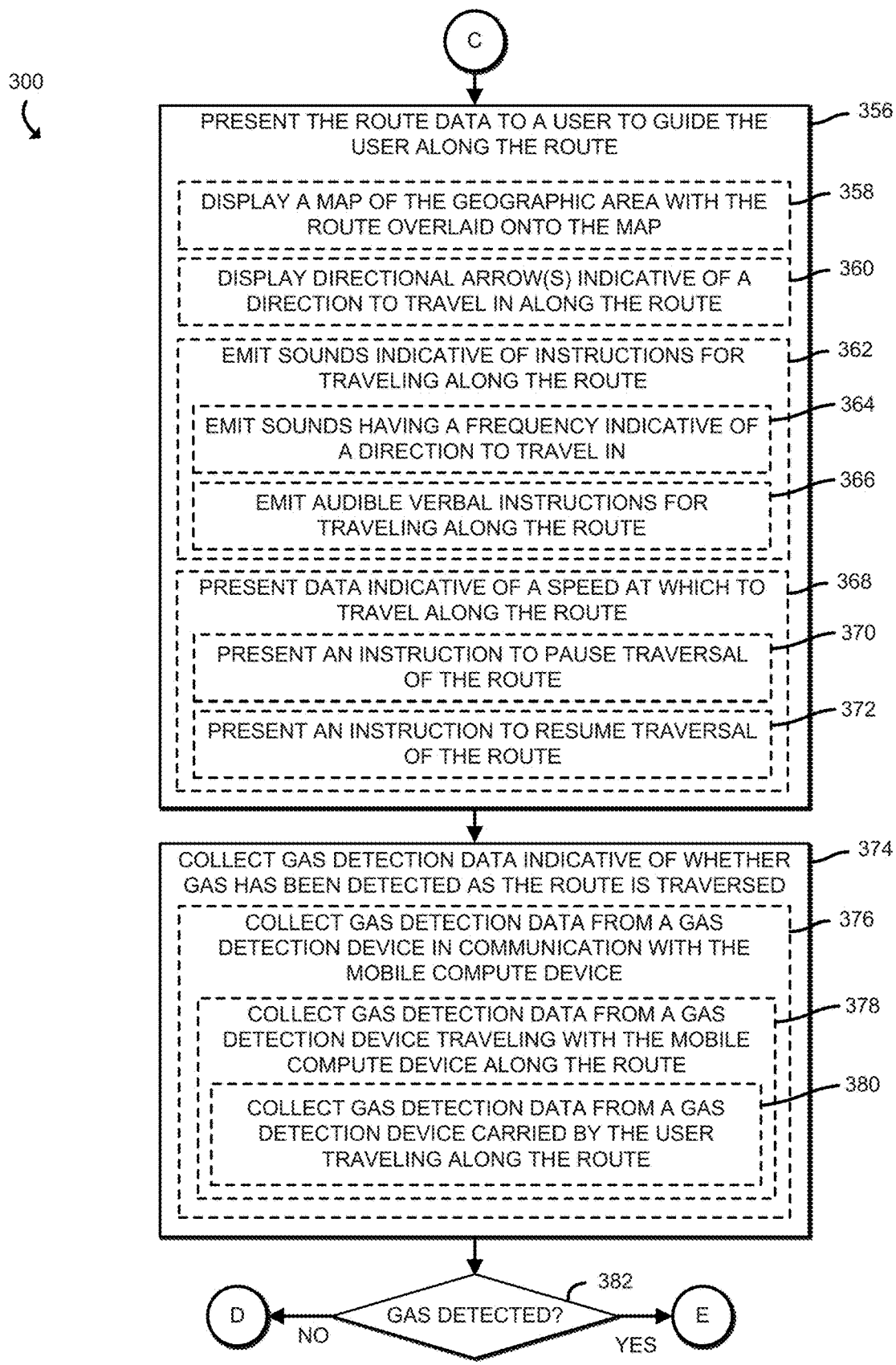

Referring now to FIG. 6, in presenting the route data, the mobile compute device 120 may display a map of the geographic area (e.g., the geographic area associated with the search area data from block 306) with the route overlaid onto the map, as indicated in block 358. Additionally or alternatively, the mobile compute device 120 may display one or more directional arrows indicative of a direction to travel along the route. As such, the displayed arrows may change in direction as the user travels along the route (e.g., to indicate that the user should change direction to continue following the route), as indicated in block 360. The directional arrows, in some embodiments, may be graphics presented on a display (e.g., on a graphical display). In other embodiments, the directional arrows may be lights (e.g., in the shapes of corresponding arrows) that the mobile compute device 120 selectively illuminates to indicate the direction in which to travel. The mobile compute device 120 may additionally display data indicative of a length to travel in a particular direction (e.g., text indicating a number of feet, yards, or meters to travel). In addition, or as an alternative to visual cues, the mobile compute device 120 may emit one or more sounds indicative of instructions for traveling along the route (e.g., to cause the investigator to follow the determined route), as indicated in block 362. In doing so, and as indicated in block 364, the mobile compute device 120 may emit sounds having a frequency (e.g., a tone, a frequency of beeps, etc.) indicative of a corresponding direction in which to travel. In other embodiments, the mobile compute device 120 may emit audible verbal instruction for traveling along the route (e.g., "turn right," "turn left," "proceed for ten meters," etc.), as indicated in block 366. Additionally or alternatively, the mobile compute device 120 may present instructions for guiding the investigator along the route through haptic signals (e.g., vibrations having different frequencies, magnitudes, and/or locations on the mobile compute device 120 that are indicative of the instructions). In addition to presenting information indicative of the direction in which to travel, the mobile compute device 120 may present (e.g., visually, audibly, haptically, etc.) data indicative of a speed at which to travel along the route, as indicated in block 368. In doing so, the mobile compute device 120 may present an instruction to pause traversal of the route (e.g., by indicating that the speed should be zero), as indicated in block 370 or may present an instruction to resume traversal of the route (e.g., by indicating a non-zero speed), as indicated in block 372. In embodiments in which the user is non-human (e.g., a robot, vehicle, or other machine), the route data may be provided to the user in a machine-compatible format (e.g., electrical signals, such as digital information, voltages indicative of corresponding data, etc.).

As indicated in block 374, the mobile compute device 120, in the illustrative embodiment, collects gas detection data indicative of whether gas has been detected as the route is traversed (e.g., traveled along). In doing so, and as indicated in block 376, the mobile compute device 120 collects gas detection data from a gas detection device in communication with the mobile compute device (e.g., a gas detection device 130, such as a spectrometer-based device that is in communication with the mobile compute device 120 through wired (e.g., Universal Serial Bus (USB) or wireless (e.g., Bluetooth) communication)). As indicated in block 378, the mobile compute device 120, in the illustrative embodiment, collects gas detection data from a gas detection device that is travelling with the mobile compute device 120 along the route. Specifically, in the illustrative embodiment, the mobile compute device 120 collects gas detection data from a gas detection device carried by (e.g., in a backpack, in a case, mounted to, etc.) the user (e.g., the investigator) traveling along the route, as indicated in block 380. Subsequently, in block 382, the mobile compute device 120 determines the subsequent course of action as a function of (e.g., based on) whether gas was detected (e.g., at the investigator's present location). If not, the method 300 loops back to block 304 of FIG. 3, in which the mobile compute device 120 may obtain further route data (e.g., an adjusted route based on changes in the wind, an adjusted route to discontinue a surge, etc.).

Figure 7:
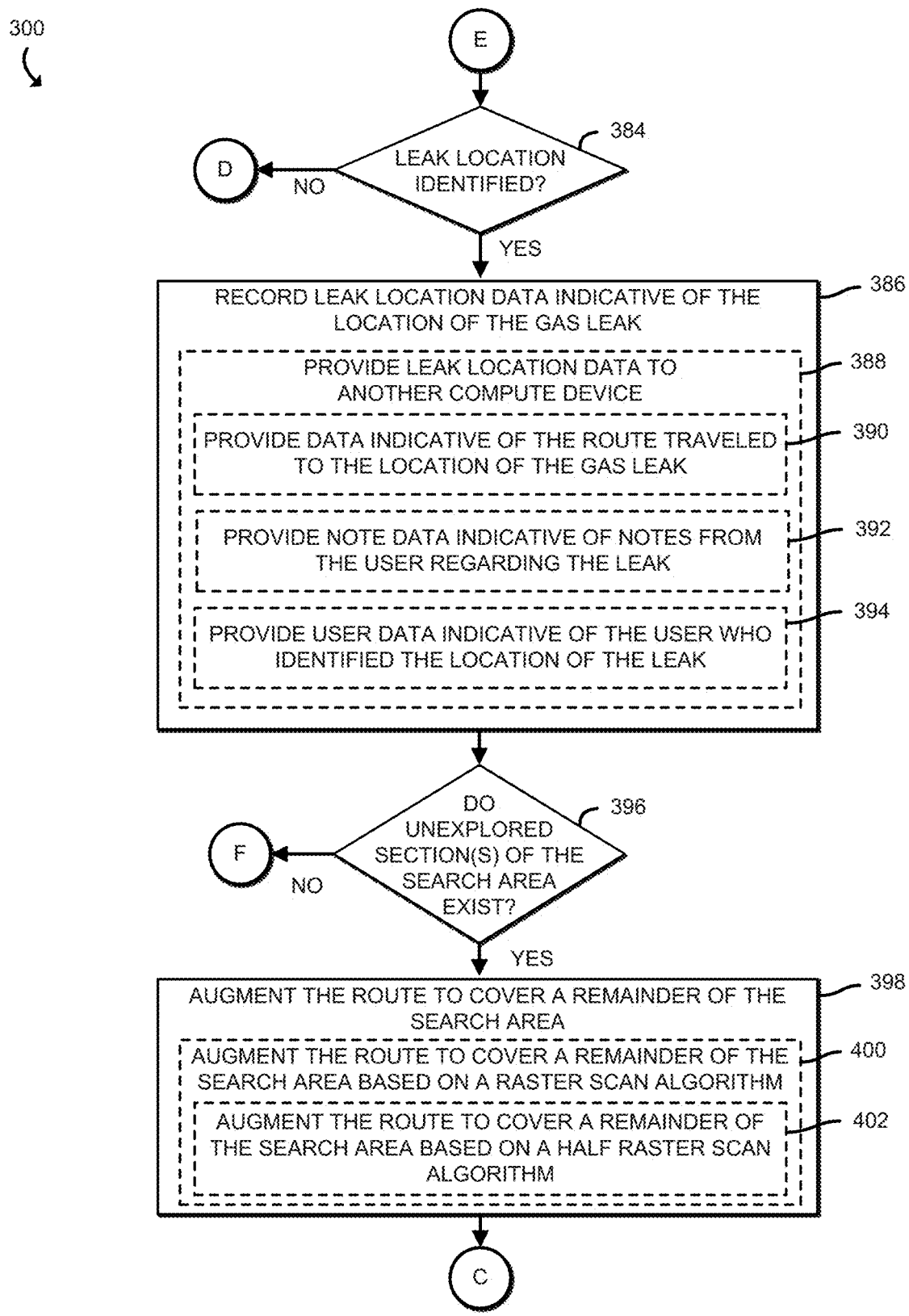

Otherwise (e.g., if gas was detected at the investigator's present location), the method 300 advances to block 384 of FIG. 7, in which the mobile compute device 120 determines the subsequent course of action based on whether the gas leak location has been identified (e.g., whether the investigator identified the gas leak at the present location along the route). The mobile compute device 120 may receive an indication of whether the investigator identified the location of the leak through an interface device 224 (e.g., by the user pressing a physical button or graphical user interface element indicating that the leak location has been found, by the user verbally stating that the leak location has been found (e.g., detected by a microphone), by the user taking a picture of the leak location (e.g., using a camera), etc.). In some embodiments, the mobile compute device 120 may determine that the gas leak location has been found based on a determination that the concentration of detected target gas (e.g., natural gas or another gas to be detected) has a reached predefined level (e.g., as reported by the gas detection device(s) 130).

Referring now to FIG. 7, if the leak location has not been identified, the method 300 loops back to block 304 of FIG. 3, in which the mobile compute device 120 again obtains route data (e.g., indicative of an updated/adjusted route). Otherwise, if the gas leak location has been identified, the method 300 proceeds to block 386, in which the mobile compute device 120 records (e.g., writes to the data storage 222) leak location data indicative of the location of the gas leak. In doing so, and as indicated in block 388, the mobile compute device 120 may provide leak location data to another compute device (e.g., one or more compute devices 152 of the cloud data center 150). In providing the leak location data to another compute device, the mobile compute device 120 may provide data indicative of the route traveled by the investigator to the location of the gas leak, as indicated in block 390. The data indicative of the route may, in some embodiments, include timing data such as data indicative of the total amount of time that elapsed for the investigator to travel along the route, locations along the route and corresponding timestamps of when the investigator was at each of those locations, etc.

As indicated in block 392, the mobile compute device 120 may provide, to the other compute device (e.g., one or more compute devices 152 of the cloud data center 150) note data indicative of notes from the user (e.g., investigator) regarding the leak. The note data may include a written (e.g., typed using a physical keyboard or onscreen keyboard, handwritten using a stylus on a touchscreen, entered through another electronic interface, etc.) or spoken (e.g., recorded speech) description of the leak, an image (e.g., obtained using a camera) of the leak, or other data indicative of notes provided by the investigator regarding the leak. In some embodiments, the mobile compute device 120 may provide, to the other compute device(s) (e.g., compute device(s) 152 of the cloud data center 150) user data, which may be embodied as any data (e.g., a name, a numeric identifier, an alphanumeric identifier, etc.) that is indicative of the user (e.g., investigator) who identified the location of the gas leak, as indicated in block 394. Afterwards, in block 396, the mobile compute device 120 determines the subsequent course of action based on whether one or more unexplored sections of the search area exist (e.g., whether the investigator traversed the entire search area).

If no unexplored sections exist, the method 300, in the illustrative embodiment, loops back to block 302 of FIG. 3 to determine whether to continue to produce efficient routes. Otherwise, if one or more unexplored sections of the search area exist, the method 300 advances to block 398, in which the mobile compute device 120 augments the route to cover a remainder of the search area (e.g., the unexplored section(s)). In augmenting the route, the mobile compute device 120 may determine the augmentation to the route locally or may add to the existing route using data received from another compute device (e.g., the compute device 152) defining the augmented route. As indicated in block 400, the mobile compute device 120 may augment the route to cover a remainder of the search area based on a raster scan algorithm. In doing so, and as indicated in block 402, the mobile compute device 102 may augment the route to cover the remainder of the search area based on a half raster scan algorithm. That is, the mobile compute device 120 may augment the route to follow a raster scan pattern of the upwind portion of the search area, to facilitate finding additional gas leaks (e.g., with the investigator sampling plausible leak sources such as manhole covers, gas meters, and pipes) that may be present in the upwind portion of the search area. The method 300 then loops back to block 356 of FIG. 6, in which the mobile compute device 120 presents the route data to the user (e.g., to guide the investigator along the augmented route) to locate additional gas leaks.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method comprising:
   generating, within a search area in which a probable gas leak has been indicated, a route defined according to at least one of a surge-cast algorithm or a surge-spiral algorithm;
   traversing, by an investigator, the route;
   pausing traversal of the route in response to a determination that a detected wind velocity satisfies a predefined threshold;
   determining that the detected wind velocity satisfies the predefined threshold for a predefined time period;
   changing, in response to the determination that the detected wind velocity satisfied the predefined threshold for the predefined time period, at least a portion of the route to follow a raster scan pattern; and
   sampling, with a gas detection device carried by the investigator, an environment along the route to identify a location of a gas leak.

2. The method of claim 1, wherein traversing the route comprises:
   traveling on a path that includes movement perpendicular to a wind direction until a presence of a target gas is detected; and
   traveling, in response to the detection of the presence of the target gas, upwind until (i) the location of the gas leak is identified, (ii) a predefined distance has been travelled, or (iii) a detected amount of the target gas has decreased by a predefined amount or percentage.

3. The method of claim 2, further comprising traveling, in response to a determination that the predefined distance has been travelled without an identification of the location of the gas leak, to a previous position along the route.

4. The method of claim 2, further comprising traveling on the path that includes movement perpendicular to the wind direction in response to a determination that the detected amount of the target gas has decreased by the predefined amount or percentage.

5. The method of claim 1, wherein traversing the route comprises:
   traveling in a spiral pattern until a presence of a target gas is detected; and
   traveling, in response to the detection of the presence of the target gas, upwind until (i) the location of the gas leak is identified, (ii) a predefined distance has been travelled, or (iii) a detected amount of the target gas has decreased by a predefined amount or percentage.

6. The method of claim 5, further comprising traveling, in response to a determination that the predefined distance has been travelled without an identification of the location of the gas leak, to a previous position along the route.

7. The method of claim 5, further comprising traveling in a spiral pattern in response to a determination that the detected amount of the target gas has decreased by the predefined amount or percentage.

8. The method of claim 1, further comprising:
   adjusting the route based on a gas plume model; and
   traversing the adjusted route.

9. The method of claim 1, wherein traversing the route comprises:
traveling in a first direction that includes movement perpendicular to a wind direction;
determining whether a predefined distance has been travelled in the first direction without a detection of a predefined amount of a target gas; and
traveling, in response to a determination that the predefined distance has been travelled without the detection of the predefined amount of the target gas, in a second direction that is opposite the first direction and includes movement perpendicular to the wind direction.

10. The method of claim 1, further comprising adjusting the route as a function of an environmental condition.

11. The method of claim 10, further comprising rotating the route based on a wind direction.

12. The method of claim 1, further comprising adjusting the route as a function of one or more objects present in the environment.

13. The method of claim 12, wherein adjusting the route comprises adjusting the route to include at least a portion of a perimeter of a building.

14. The method of claim 12, wherein adjusting the route comprises adjusting the route to follow an edge of a street.

15. The method of claim 12, wherein adjusting the route comprises adjusting the route to follow at least a portion of a gas line or other gas management infrastructure.

16. A system comprising:
a gas detection device carried by an investigator; and
circuitry configured to:
generate, within a search area in which a probable gas leak has been indicated, a route defined according to at least one of a surge-cast algorithm or a surge-spiral algorithm;
direct the investigator along the route;
direct the investigator to pause traversal of the route in response to a determination that a detected wind velocity satisfies a predefined threshold;
determine whether the detected wind velocity satisfies the predefined threshold for a predefined time period;
change, in response to a determination that the detected wind velocity satisfied the predefined threshold for the predefined time period, at least a portion of the route to follow a raster scan pattern; and
sample, with the gas detection device, an environment along the route to identify a location of a gas leak.

17. One or more non-transitory machine-readable storage media comprising a plurality of instructions stored thereon that, in response to being executed by a system, cause the system to:
generate, within a search area in which a probable gas leak has been indicated, a route defined according to at least one of a surge-cast algorithm or a surge-spiral algorithm;
direct an investigator along the route;
direct the investigator to pause traversal of the route in response to a determination that a detected wind velocity satisfies a predefined threshold;
determine whether the detected wind velocity satisfies the predefined threshold for a predefined time period;
change, in response to a determination that the detected wind velocity satisfied the predefined threshold for the predefined time period, at least a portion of the route to follow a raster scan pattern; and
sample, with a gas detection device carried by the investigator, an environment along the route to identify a location of a gas leak.

18. A method comprising:
generating, within a search area in which a probable gas leak has been indicated, a route defined according to at least one of a surge-cast algorithm or a surge-spiral algorithm;
traversing, by an investigator, the route;
determining one or more changes in a wind direction over a time period;
determining that the one or more changes in the wind direction are stochastic;
pausing, in response to the determination that the one or more changes in the wind direction are stochastic, traversal of the route;
determining that changes in the wind direction have remained stochastic for at least thirty seconds;
changing, in response to the determination that the changes in the wind direction have remained stochastic for at least thirty seconds, at least a portion of the route to follow a raster scan pattern; and
sampling, with a gas detection device carried by the investigator, an environment along the route to identify a location of a gas leak.

19. A system comprising:
a gas detection device carried by an investigator; and
circuitry configured to:
generate, within a search area in which a probable gas leak has been indicated, a route defined according to at least one of a surge-cast algorithm or a surge-spiral algorithm;
direct the investigator along the route;
determine one or more changes in a wind direction over a time period;
determine whether the one or more changes in the wind direction are stochastic;
direct the investigator to pause, in response to a determination that the one or more changes in the wind direction are stochastic, traversal of the route;
determine whether changes in the wind direction have remained stochastic for at least thirty seconds;
change, in response to a determination that the changes in the wind direction have remained stochastic for at least thirty seconds, at least a portion of the route to follow a raster scan pattern; and
sample, with the gas detection device, an environment along the route to identify a location of a gas leak.

20. One or more non-transitory machine-readable storage media comprising a plurality of instructions stored thereon that, in response to being executed by a system, cause the system to:
generate, within a search area in which a probable gas leak has been indicated, a route defined according to at least one of a surge-cast algorithm or a surge-spiral algorithm;
direct an investigator along the route;
determine one or more changes in a wind direction over a time period;
determine whether the one or more changes in the wind direction are stochastic;
direct the investigator to pause, in response to a determination that the one or more changes in the wind direction are stochastic, traversal of the route;
determine whether changes in the wind direction have remained stochastic for at least thirty seconds;

change, in response to a determination that the changes in the wind direction have remained stochastic for at least thirty seconds, at least a portion of the route to follow a raster scan pattern; and sample, with a gas detection device carried by the investigator, an environment along the route to identify a location of a gas leak.

21. A method comprising:

generating, within a search area in which a probable gas leak has been indicated, a route defined according to at least one of a surge-cast algorithm or a surge-spiral algorithm;

traversing, by an investigator, the route;

sampling, with a gas detection device carried by the investigator, an environment along the route to identify a location of a gas leak;

determining that the location of the gas leak has been identified along the route;

augmenting, in response to the determination that the location of the gas leak has been identified, the route to cover a remainder of the search area based on a raster scan pattern; and traversing the augmented route while sampling the environment along the augmented route to locate an additional gas leak.

22. A system comprising:

a gas detection device carried by an investigator; and circuitry configured to:

generate, within a search area in which a probable gas leak has been indicated, a route defined according to at least one of a surge-cast algorithm or a surge-spiral algorithm;

direct the investigator to traverse the route;

sample, with the gas detection device, an environment along the route to identify a location of a gas leak;

determine whether the location of the gas leak has been identified along the route;

augment, in response to a determination that the location of the gas leak has been identified, the route to cover a remainder of the search area based on a raster scan pattern; and direct the investigator to traverse the augmented route while sampling the environment along the augmented route to locate an additional gas leak.

23. One or more non-transitory machine-readable storage media comprising a plurality of instructions stored thereon that, in response to being executed by a system, cause the system to:

generate, within a search area in which a probable gas leak has been indicated, a route defined according to at least one of a surge-cast algorithm or a surge-spiral algorithm;

direct an investigator to traverse the route;

sample, with a gas detection device carried by the investigator, an environment along the route to identify a location of a gas leak;

determine whether the location of the gas leak has been identified along the route;

augment, in response to a determination that the location of the gas leak has been identified, the route to cover a remainder of the search area based on a raster scan pattern; and direct the investigator to traverse the augmented route while sampling the environment along the augmented route to locate an additional gas leak.

* * * * *